United States Patent
Ouimet et al.

(10) Patent No.: US 12,380,159 B2
(45) Date of Patent: *Aug. 5, 2025

(54) PRIORITIZED DEVICE ACTIONS TRIGGERED BY DEVICE SCAN DATA

(71) Applicant: Snap Inc., Santa Monica, CA (US)

(72) Inventors: Kirk Ouimet, Orem, UT (US); Rong Yan, Marina Del Rey, CA (US); Yantao Zheng, Sunnyvale, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/122,328

(22) Filed: Mar. 16, 2023

(65) Prior Publication Data

US 2023/0222155 A1 Jul. 13, 2023

Related U.S. Application Data

(63) Continuation of application No. 15/929,483, filed on May 5, 2020, now Pat. No. 11,630,974, which is a
(Continued)

(51) Int. Cl.
*G06F 16/58* (2019.01)
*G06F 16/9038* (2019.01)
(Continued)

(52) U.S. Cl.
CPC ...... *G06F 16/5866* (2019.01); *G06F 16/9038* (2019.01); *G06F 18/24* (2023.01);
(Continued)

(58) Field of Classification Search
CPC ............ G06F 16/5866; G06F 16/9038; G06K 9/6202; G06K 2209/25; G06N 3/04; G06N 3/08; H04N 5/23293
(Continued)

(56) References Cited

U.S. PATENT DOCUMENTS

| 5,754,939 A | 5/1998 | Herz et al. |
| 5,996,023 A | 11/1999 | Winter et al. |

(Continued)

FOREIGN PATENT DOCUMENTS

| CA | 2887596 A1 | 7/2015 |
| WO | WO-2012000107 A1 | 1/2012 |

(Continued)

OTHER PUBLICATIONS

"U.S. Appl. No. 15/008,885, Final Office Action mailed Feb. 10, 2021", 47 pgs.

(Continued)

*Primary Examiner* — Hanh B Thai
(74) *Attorney, Agent, or Firm* — Schwegman Lundberg & Woessner, P.A.

(57) ABSTRACT

Systems, methods, devices, server computers, storage media, and instructions for prioritized device action triggered by device scan data are described. In one embodiment, a mobile device performs a method that involves executing a messaging application with an image capture interface and a scanning input. An associated scanning mode comprises capture of scan data from a plurality of input/output modules of the first client device, analyzes the scan data to identify one or more scan data patterns by matching at least a portion of the scan data against a set of data patterns, and selects a priority system action based on the results of the matching of the portion of the scan data against the set of data patterns. In some embodiments, the priority system action is selected based on a priority ranking for identified scan data types.

19 Claims, 12 Drawing Sheets

Related U.S. Application Data continuation of application No. 15/265,672, filed on Sep. 14, 2016, now Pat. No. 10,678,849.

(60) Provisional application No. 62/358,461, filed on Jul. 5, 2016, provisional application No. 62/218,965, filed on Sep. 15, 2015.

(51) Int. Cl.

| | |
|---|---|
| *G06F 18/24* | (2023.01) |
| *G06N 3/04* | (2023.01) |
| *G06N 3/045* | (2023.01) |
| *G06N 3/08* | (2023.01) |
| *G06T 1/00* | (2006.01) |
| *G06V 10/75* | (2022.01) |
| *G06V 10/764* | (2022.01) |
| *G06V 10/82* | (2022.01) |
| *H04N 23/63* | (2023.01) |
| *G06N 5/022* | (2023.01) |

(52) U.S. Cl.
CPC ............ *G06N 3/04* (2013.01); *G06N 3/045* (2023.01); *G06N 3/08* (2013.01); *G06T 1/0007* (2013.01); *G06V 10/751* (2022.01); *G06V 10/764* (2022.01); *G06V 10/82* (2022.01); *H04N 23/63* (2023.01); *G06N 5/022* (2013.01); *G06V 2201/09* (2022.01)

(58) Field of Classification Search
USPC ...................................................... 707/769
See application file for complete search history.

(56) References Cited

U.S. PATENT DOCUMENTS

| | | | |
|---|---|---|---|
| 6,038,295 A | 3/2000 | Mattes | |
| 6,158,044 A | 12/2000 | Tibbetts | |
| 6,167,435 A | 12/2000 | Druckenmiller et al. | |
| 6,205,432 B1 | 3/2001 | Gabbard et al. | |
| 6,310,694 B1 | 10/2001 | Okimoto et al. | |
| 6,323,761 B1 * | 11/2001 | Son ..................... B60R 25/305 340/426.35 | |
| 6,481,625 B2 | 11/2002 | Lucera et al. | |
| 6,484,196 B1 | 11/2002 | Maurille | |
| 6,487,586 B2 | 11/2002 | Ogilvie et al. | |
| 6,665,531 B1 | 12/2003 | Soderbacka et al. | |
| 6,701,347 B1 | 3/2004 | Ogilvie | |
| 6,711,608 B1 | 3/2004 | Ogilvie | |
| 6,757,713 B1 | 6/2004 | Ogilvie et al. | |
| 6,963,659 B2 | 11/2005 | Tumey et al. | |
| 6,980,909 B2 | 12/2005 | Root et al. | |
| 7,124,164 B1 | 10/2006 | Chemtob | |
| 7,149,893 B1 | 12/2006 | Leonard et al. | |
| 7,173,651 B1 | 2/2007 | Knowles | |
| 7,243,163 B1 | 7/2007 | Friend et al. | |
| 7,278,168 B1 | 10/2007 | Chaudhury et al. | |
| 7,356,564 B2 | 4/2008 | Hartselle et al. | |
| 7,376,715 B2 | 5/2008 | Cunningham et al. | |
| 7,411,493 B2 | 8/2008 | Smith | |
| 7,478,402 B2 | 1/2009 | Christensen et al. | |
| 7,496,347 B2 | 2/2009 | Puranik | |
| 7,519,200 B2 | 4/2009 | Gokturk et al. | |
| 7,519,670 B2 | 4/2009 | Hagale et al. | |
| 7,535,890 B2 | 5/2009 | Rojas | |
| 7,607,096 B2 | 10/2009 | Oreizy et al. | |
| 7,703,140 B2 | 4/2010 | Nath et al. | |
| 7,753,269 B2 | 7/2010 | Russell et al. | |
| 7,912,896 B2 | 3/2011 | Wolovitz et al. | |
| 8,131,597 B2 | 3/2012 | Hudetz | |
| 8,155,329 B1 | 4/2012 | Silaika | |
| 8,170,957 B2 | 5/2012 | Richard | |
| 8,199,747 B2 | 6/2012 | Rojas et al. | |
| 8,214,443 B2 | 7/2012 | Hamburg | |
| 8,238,947 B2 | 8/2012 | Lottin et al. | |
| 8,244,593 B2 | 8/2012 | Klinger et al. | |
| 8,312,097 B1 | 11/2012 | Siegel et al. | |
| 8,332,475 B2 | 12/2012 | Rosen et al. | |
| 8,489,115 B2 | 7/2013 | Rodriguez | |
| 8,570,907 B2 | 10/2013 | Garcia, Jr. et al. | |
| 8,718,333 B2 | 5/2014 | Wolf et al. | |
| 8,724,622 B2 | 5/2014 | Rojas | |
| 8,745,058 B1 | 6/2014 | Garcia-Barrio | |
| 8,745,132 B2 | 6/2014 | Obradovich | |
| 8,793,274 B2 | 7/2014 | Yu et al. | |
| 8,819,035 B2 | 8/2014 | Boetje | |
| 8,850,490 B1 | 9/2014 | Thomas et al. | |
| 8,868,223 B1 | 10/2014 | Sharifi | |
| 8,874,677 B2 | 10/2014 | Rosen et al. | |
| 8,892,588 B2 | 11/2014 | Bennett | |
| 8,909,679 B2 | 12/2014 | Root et al. | |
| 8,909,714 B2 | 12/2014 | Agarwal et al. | |
| 8,909,725 B1 | 12/2014 | Sehn | |
| 8,913,285 B1 | 12/2014 | Neubrand | |
| 8,914,752 B1 | 12/2014 | Spiegel | |
| 8,924,890 B2 | 12/2014 | Begeja et al. | |
| 8,995,433 B2 | 3/2015 | Rojas | |
| 9,040,574 B2 | 5/2015 | Wang et al. | |
| 9,055,416 B2 | 6/2015 | Rosen et al. | |
| 9,083,770 B1 | 7/2015 | Drose et al. | |
| 9,094,137 B1 | 7/2015 | Sehn et al. | |
| 9,100,806 B2 | 8/2015 | Rosen et al. | |
| 9,100,807 B2 | 8/2015 | Rosen et al. | |
| 9,113,301 B1 | 8/2015 | Spiegel et al. | |
| 9,148,424 B1 | 9/2015 | Yang | |
| 9,191,776 B2 | 11/2015 | Root et al. | |
| 9,195,880 B1 | 11/2015 | Levoy et al. | |
| 9,204,252 B2 | 12/2015 | Root | |
| 9,225,805 B2 | 12/2015 | Kujawa et al. | |
| 9,225,897 B1 | 12/2015 | Sehn et al. | |
| 9,237,202 B1 | 1/2016 | Sehn | |
| 9,264,463 B2 | 2/2016 | Rubinstein et al. | |
| 9,264,485 B1 * | 2/2016 | Ranganathan .......... H04L 67/10 | |
| 9,276,886 B1 | 3/2016 | Samaranayake | |
| 9,294,425 B1 | 3/2016 | Son | |
| 9,385,983 B1 | 7/2016 | Sehn | |
| 9,396,354 B1 | 7/2016 | Murphy et al. | |
| 9,407,712 B1 | 8/2016 | Sehn | |
| 9,407,816 B1 | 8/2016 | Sehn | |
| 9,430,783 B1 | 8/2016 | Sehn | |
| 9,443,227 B2 | 9/2016 | Evans et al. | |
| 9,443,270 B1 | 9/2016 | Friedman et al. | |
| 9,482,882 B1 | 11/2016 | Hanover et al. | |
| 9,482,883 B1 | 11/2016 | Meisenholder | |
| 9,489,661 B2 | 11/2016 | Evans et al. | |
| 9,491,134 B2 | 11/2016 | Rosen et al. | |
| 9,532,171 B2 | 12/2016 | Allen et al. | |
| 9,537,811 B2 | 1/2017 | Allen et al. | |
| 9,560,006 B2 | 1/2017 | Prado et al. | |
| 9,628,950 B1 | 4/2017 | Noeth et al. | |
| 9,652,896 B1 | 5/2017 | Jurgenson et al. | |
| 9,659,244 B2 | 5/2017 | Anderton et al. | |
| 9,665,799 B1 | 5/2017 | Munteanu et al. | |
| 9,693,191 B2 | 6/2017 | Sehn | |
| 9,705,831 B2 | 7/2017 | Spiegel | |
| 9,742,713 B2 | 8/2017 | Spiegel et al. | |
| 9,785,796 B1 | 10/2017 | Murphy et al. | |
| 9,825,898 B2 | 11/2017 | Sehn | |
| 9,854,219 B2 | 12/2017 | Sehn | |
| 9,961,520 B2 | 5/2018 | Brooks et al. | |
| 10,157,333 B1 | 12/2018 | Wang et al. | |
| 10,540,575 B1 | 1/2020 | Brody | |
| 10,678,849 B1 | 6/2020 | Ouimet et al. | |
| 10,909,425 B1 | 2/2021 | Brody | |
| 10,956,793 B1 | 3/2021 | Wang et al. | |
| 11,334,768 B1 | 5/2022 | Brody | |
| 11,630,974 B2 | 4/2023 | Ouimet et al. | |
| 11,822,600 B2 | 11/2023 | Wang et al. | |
| 2002/0047868 A1 | 4/2002 | Miyazawa | |
| 2002/0118195 A1 | 8/2002 | Paetzold et al. | |
| 2002/0144154 A1 | 10/2002 | Tomkow | |
| 2003/0052925 A1 | 3/2003 | Daimon et al. | |
| 2003/0126215 A1 | 7/2003 | Udell | |

(56) References Cited

U.S. PATENT DOCUMENTS

| | | |
|---|---|---|
| 2003/0217106 A1 | 11/2003 | Adar et al. |
| 2003/0224776 A1 | 12/2003 | Meng |
| 2004/0010516 A1 | 1/2004 | Meng |
| 2004/0203959 A1 | 10/2004 | Coombes |
| 2005/0060299 A1 | 3/2005 | Filley et al. |
| 2005/0097176 A1 | 5/2005 | Schatz et al. |
| 2005/0198128 A1 | 9/2005 | Anderson |
| 2005/0223066 A1 | 10/2005 | Buchheit et al. |
| 2006/0184538 A1 | 8/2006 | Randall et al. |
| 2006/0242239 A1 | 10/2006 | Morishima et al. |
| 2006/0249588 A1 | 11/2006 | Walmsley et al. |
| 2006/0253462 A1 | 11/2006 | Gras |
| 2006/0270419 A1 | 11/2006 | Crowley et al. |
| 2007/0038715 A1 | 2/2007 | Collins et al. |
| 2007/0064899 A1 | 3/2007 | Boss et al. |
| 2007/0073823 A1 | 3/2007 | Cohen et al. |
| 2007/0214216 A1 | 9/2007 | Carrer et al. |
| 2007/0233801 A1 | 10/2007 | Eren et al. |
| 2008/0002864 A1 | 1/2008 | Das et al. |
| 2008/0005105 A1 | 1/2008 | Lawler et al. |
| 2008/0055269 A1 | 3/2008 | Lemay et al. |
| 2008/0120409 A1 | 5/2008 | Sun et al. |
| 2008/0207176 A1 | 8/2008 | Brackbill et al. |
| 2008/0270938 A1 | 10/2008 | Carlson |
| 2008/0303833 A1 | 12/2008 | Swift et al. |
| 2008/0306826 A1 | 12/2008 | Kramer et al. |
| 2008/0313172 A1* | 12/2008 | King .................. G06F 40/174 707/999.005 |
| 2008/0313346 A1 | 12/2008 | Kujawa et al. |
| 2009/0012940 A1 | 1/2009 | Ives et al. |
| 2009/0016532 A1 | 1/2009 | Baldischweiler |
| 2009/0042588 A1 | 2/2009 | Lottin et al. |
| 2009/0113305 A1 | 4/2009 | Graif et al. |
| 2009/0132453 A1 | 5/2009 | Hangartner et al. |
| 2009/0177665 A1* | 7/2009 | Callery .................. G06Q 10/10 |
| 2010/0009700 A1 | 1/2010 | Camp, Jr. et al. |
| 2010/0082427 A1 | 4/2010 | Burgener et al. |
| 2010/0114876 A1 | 5/2010 | Mandel et al. |
| 2010/0131880 A1 | 5/2010 | Lee et al. |
| 2010/0185665 A1 | 7/2010 | Horn et al. |
| 2010/0214936 A1 | 8/2010 | Ito et al. |
| 2010/0293173 A1 | 11/2010 | Chapin et al. |
| 2010/0306193 A1 | 12/2010 | Pereira et al. |
| 2010/0306669 A1 | 12/2010 | Della Pasqua |
| 2011/0061028 A1 | 3/2011 | Bachman et al. |
| 2011/0099507 A1 | 4/2011 | Nesladek et al. |
| 2011/0145564 A1 | 6/2011 | Moshir et al. |
| 2011/0202598 A1 | 8/2011 | Evans et al. |
| 2011/0213845 A1 | 9/2011 | Logan et al. |
| 2011/0282508 A1* | 11/2011 | Goutard .................. H02J 3/06 700/286 |
| 2011/0282906 A1 | 11/2011 | Wong |
| 2011/0286586 A1 | 11/2011 | Saylor et al. |
| 2011/0295842 A1* | 12/2011 | King .................. G06F 16/93 707/769 |
| 2011/0320202 A1 | 12/2011 | Kaufman |
| 2011/0320373 A1 | 12/2011 | Lee et al. |
| 2012/0028659 A1 | 2/2012 | Whitney et al. |
| 2012/0078936 A1 | 3/2012 | Kuo et al. |
| 2012/0112995 A1* | 5/2012 | Maeda .................. G10L 17/00 345/156 |
| 2012/0166472 A1 | 6/2012 | Hoppenot et al. |
| 2012/0184248 A1 | 7/2012 | Speede |
| 2012/0203761 A1 | 8/2012 | Biran et al. |
| 2012/0209921 A1 | 8/2012 | Adafin et al. |
| 2012/0209924 A1 | 8/2012 | Evans et al. |
| 2012/0254325 A1 | 10/2012 | Majeti et al. |
| 2012/0278692 A1 | 11/2012 | Shi |
| 2012/0294520 A1 | 11/2012 | Mei et al. |
| 2012/0304080 A1 | 11/2012 | Wormald et al. |
| 2013/0071093 A1 | 3/2013 | Hanks et al. |
| 2013/0073280 A1* | 3/2013 | O'Neil .................. G06F 40/20 704/E11.001 |
| 2013/0073568 A1* | 3/2013 | Federov .............. G06Q 30/0269 707/E17.069 |
| 2013/0073632 A1* | 3/2013 | Fedorov .............. G06Q 10/101 709/205 |
| 2013/0073979 A1* | 3/2013 | Shepherd .............. G06Q 50/01 715/744 |
| 2013/0073983 A1* | 3/2013 | Rasmussen .............. G06Q 30/02 715/753 |
| 2013/0121571 A1 | 5/2013 | Gokturk et al. |
| 2013/0177296 A1 | 7/2013 | Geisner et al. |
| 2013/0185288 A1 | 7/2013 | Nishiyama et al. |
| 2013/0194301 A1 | 8/2013 | Robbins et al. |
| 2013/0201527 A1* | 8/2013 | King .................. G06F 40/117 358/1.15 |
| 2013/0226850 A1 | 8/2013 | Hannuksela et al. |
| 2013/0262935 A1 | 10/2013 | Kutchuk et al. |
| 2013/0279757 A1 | 10/2013 | Kephart |
| 2013/0279810 A1 | 10/2013 | Li et al. |
| 2013/0290443 A1 | 10/2013 | Collins et al. |
| 2013/0325605 A1 | 12/2013 | Callaghan et al. |
| 2014/0006020 A1 | 1/2014 | Ko et al. |
| 2014/0032682 A1 | 1/2014 | Prado et al. |
| 2014/0067945 A1 | 3/2014 | Archibong et al. |
| 2014/0075004 A1* | 3/2014 | Van Dusen .............. G06N 5/02 709/223 |
| 2014/0089815 A1 | 3/2014 | Gildfind et al. |
| 2014/0122787 A1 | 5/2014 | Shalvi et al. |
| 2014/0188894 A1 | 7/2014 | Chechik et al. |
| 2014/0201126 A1* | 7/2014 | Zadeh .................. A61B 5/165 706/52 |
| 2014/0201527 A1 | 7/2014 | Krivorot |
| 2014/0282096 A1 | 9/2014 | Rubinstein et al. |
| 2014/0323156 A1 | 10/2014 | Gilberton et al. |
| 2014/0325383 A1 | 10/2014 | Brown et al. |
| 2014/0337346 A1 | 11/2014 | Barthel et al. |
| 2014/0359024 A1 | 12/2014 | Spiegel |
| 2014/0359032 A1 | 12/2014 | Spiegel et al. |
| 2015/0010289 A1 | 1/2015 | Lindblom |
| 2015/0012525 A1 | 1/2015 | Lindsay |
| 2015/0033366 A1 | 1/2015 | Guffrey et al. |
| 2015/0052431 A1 | 2/2015 | Zhu et al. |
| 2015/0127710 A1 | 5/2015 | Ady et al. |
| 2015/0199082 A1 | 7/2015 | Scholler et al. |
| 2015/0227557 A1 | 8/2015 | Holzschneider et al. |
| 2015/0227602 A1 | 8/2015 | Ramu et al. |
| 2015/0254356 A1 | 9/2015 | Skrenta et al. |
| 2015/0286481 A1 | 10/2015 | Walker |
| 2015/0324395 A1 | 11/2015 | Arnold et al. |
| 2016/0026912 A1 | 1/2016 | Falcon et al. |
| 2016/0085773 A1 | 3/2016 | Chang et al. |
| 2016/0085863 A1 | 3/2016 | Allen et al. |
| 2016/0086670 A1 | 3/2016 | Gross et al. |
| 2016/0099901 A1 | 4/2016 | Allen et al. |
| 2016/0147803 A1* | 5/2016 | Noll .................. G06F 16/2272 707/741 |
| 2016/0147823 A1* | 5/2016 | Noll .................. G06F 16/2272 707/694 |
| 2016/0150333 A1 | 5/2016 | Goldstein et al. |
| 2016/0180887 A1 | 6/2016 | Sehn |
| 2016/0182417 A1* | 6/2016 | Cordes .................. H04L 51/08 709/206 |
| 2016/0189009 A1 | 6/2016 | Tran et al. |
| 2016/0196350 A1 | 7/2016 | Mau |
| 2016/0275414 A1 | 9/2016 | Towal |
| 2016/0277419 A1 | 9/2016 | Allen et al. |
| 2016/0321708 A1 | 11/2016 | Sehn |
| 2016/0359778 A1 | 12/2016 | Shi |
| 2016/0359957 A1 | 12/2016 | Laliberte |
| 2016/0359987 A1 | 12/2016 | Laliberte |
| 2016/0365117 A1 | 12/2016 | Boliek et al. |
| 2016/0365122 A1 | 12/2016 | Steinberg et al. |
| 2017/0004383 A1 | 1/2017 | Lin et al. |
| 2017/0118306 A1 | 4/2017 | Madhvanath et al. |
| 2017/0161382 A1 | 6/2017 | Ouimet et al. |
| 2017/0206450 A1 | 7/2017 | Umeda |
| 2017/0263029 A1 | 9/2017 | Yan et al. |
| 2017/0287006 A1 | 10/2017 | Azmoodeh et al. |
| 2017/0295250 A1 | 10/2017 | Samaranayake et al. |

(56) References Cited

U.S. PATENT DOCUMENTS

| | | | |
|---|---|---|---|
| 2017/0364660 | A1 | 12/2017 | Vigersky et al. |
| 2017/0374003 | A1 | 12/2017 | Allen et al. |
| 2017/0374508 | A1 | 12/2017 | Davis et al. |
| 2018/0032082 | A1* | 2/2018 | Shalev-Shwartz ..... G06N 20/00 |
| 2018/0341833 | A1* | 11/2018 | Bernard .................. G06F 40/56 |
| 2019/0146636 | A1* | 5/2019 | Kremer-Davidson ....................... H04L 67/306 706/11 |
| 2021/0019575 | A1 | 1/2021 | Ouimet et al. |
| 2021/0103779 | A1 | 4/2021 | Brody |
| 2021/0216830 | A1 | 7/2021 | Wang et al. |
| 2022/0383053 | A1 | 12/2022 | Brody |
| 2024/0037141 | A1 | 2/2024 | Wang et al. |

FOREIGN PATENT DOCUMENTS

| | | |
|---|---|---|
| WO | WO-2013008251 A2 | 1/2013 |
| WO | WO-2014194262 A2 | 12/2014 |
| WO | WO-2015192026 A1 | 12/2015 |
| WO | WO-2016054562 A1 | 4/2016 |
| WO | WO-2016065131 A1 | 4/2016 |
| WO | WO-2016/112299 A1 | 7/2016 |
| WO | WO-2016179166 A1 | 11/2016 |
| WO | WO-2016179235 A1 | 11/2016 |
| WO | WO-2017100476 A1 | 6/2017 |
| WO | WO-2017176739 A1 | 10/2017 |
| WO | WO-2017176992 A1 | 10/2017 |
| WO | WO-2018005644 A1 | 1/2018 |

OTHER PUBLICATIONS

"U.S. Appl. No. 15/008,885, Final Office Action mailed Mar. 6, 2019", 32 pgs.

"U.S. Appl. No. 15/008,885, Final Office Action mailed Mar. 21, 2022", 49 pgs.

"U.S. Appl. No. 15/008,885, Final Office Action mailed Apr. 24, 2020", 38 pgs.

"U.S. Appl. No. 15/008,885, Non Final Office Action mailed Jul. 29, 2021", 49 pgs.

"U.S. Appl. No. 15/008,885, Non Final Office Action mailed Aug. 6, 2018", 35 pgs.

"U.S. Appl. No. 15/008,885, Non Final Office Action mailed Aug. 6, 2020", 40 pgs.

"U.S. Appl. No. 15/008,885, Non Final Office Action mailed Oct. 2, 2019", 38 pgs.

"U.S. Appl. No. 15/008,885, Response filed Jan. 6, 2021 to Non Final Office Action mailed Aug. 6, 2020", 12 pgs.

"U.S. Appl. No. 15/008,885, Response filed Feb. 3, 2020 to Non Final Office Action mailed Oct. 2, 2019", 12 pgs.

"U.S. Appl. No. 15/008,885, Response filed Jul. 12, 2021 to Final Office Action mailed Feb. 10, 2021", 14 pgs.

"U.S. Appl. No. 15/008,885, Response filed Jul. 24, 2020 to Final Office Action mailed Apr. 24, 2020", 12 pgs.

"U.S. Appl. No. 15/008,885, Response filed Jan. 7, 2019 to Non Final Office Action mailed Aug. 6, 2018", 10 pgs.

"U.S. Appl. No. 15/008,885, Response filed Nov. 29, 2021 to Non Final Office Action mailed Jul. 29, 2021", 14 pgs.

"U.S. Appl. No. 15/008,885, Response filed Sep. 6, 2019 to Final Office Action mailed Mar. 6, 2019", 12 pgs.

"U.S. Appl. No. 15/008,956, Final Office Action mailed Mar. 5, 2019", 21 pgs.

"U.S. Appl. No. 15/008,956, Final Office Action mailed May 1, 2020", 27 pgs.

"U.S. Appl. No. 15/008,956, Non Final Office Action mailed Aug. 6, 2018", 22 pgs.

"U.S. Appl. No. 15/008,956, Non Final Office Action mailed Oct. 4, 2019", 21 pgs.

"U.S. Appl. No. 15/008,956, Response filed Jan. 8, 2019 to Non Final Office Action mailed Aug. 6, 2018", 11 pgs.

"U.S. Appl. No. 15/008,956, Response filed Feb. 4, 2020 to Non Final Office Action mailed Oct. 4, 2019", 11 pgs.

"U.S. Appl. No. 15/008,956, Response filed Sep. 5, 2019 to Final Office Action mailed Mar. 5, 2019", 9 pgs.

"U.S. Appl. No. 15/009,402, Final Office Action mailed Feb. 28, 2020", 22 pgs.

"U.S. Appl. No. 15/009,402, Final Office Action mailed Mar. 22, 2019", 17 pgs.

"U.S. Appl. No. 15/009,402, Non Final Office Action mailed Aug. 16, 2018", 18 pgs.

"U.S. Appl. No. 15/009,402, Non Final Office Action mailed Oct. 3, 2019", 19 pgs.

"U.S. Appl. No. 15/009,402, Response filed Jan. 16, 2019 to Non Final Office Action mailed Aug. 16, 2018", 7 pgs.

"U.S. Appl. No. 15/009,402, Response filed Feb. 3, 2020 to Non Final Office Action mailed Oct. 3, 2019", 11 pgs.

"U.S. Appl. No. 15/009,402, Response filed Sep. 21, 2019 to Final Office Action mailed Mar. 22, 2019", 11 pgs.

"U.S. Appl. No. 15/247,697, Corrected Notice of Allowability mailed Sep. 21, 2018", 13 pgs.

"U.S. Appl. No. 15/247,697, Examiner Interview Summary mailed Aug. 8, 2018", 1 pg.

"U.S. Appl. No. 15/247,697, Notice of Allowance mailed Aug. 8, 2018", 25 pgs.

"U.S. Appl. No. 15/265,672, Non Final Office Action mailed Jan. 14, 2019", 10 pgs.

"U.S. Appl. No. 15/265,672, Non Final Office Action mailed Jul. 15, 2019", 9 pgs.

"U.S. Appl. No. 15/265,672, Notice of Allowance mailed Jan. 28, 2020", 10 pgs.

"U.S. Appl. No. 15/265,672, Response filed Apr. 15, 2019 to Non Final Office Action mailed Jan. 14, 2019", 12 pgs.

"U.S. Appl. No. 15/265,672, Response filed Oct. 14, 2019 to Non-Final Office Action mailed Jul. 15, 2019", 11 pgs.

"U.S. Appl. No. 15/640,106, Notice of Allowance mailed Jul. 30, 2019", 8 pgs.

"U.S. Appl. No. 15/640,124, Advisory Action mailed Mar. 19, 2020", 2 pgs.

"U.S. Appl. No. 15/640,124, Final Office Action mailed Dec. 31, 2019", 16 pgs.

"U.S. Appl. No. 15/640,124, Non Final Office Action mailed Apr. 30, 2020", 16 pgs.

"U.S. Appl. No. 15/640,124, Non Final Office Action mailed May 17, 2019", 12 pgs.

"U.S. Appl. No. 15/640,124, Response filed Mar. 2, 2020 to Final Office Action mailed Dec. 31, 2019", 13 pgs.

"U.S. Appl. No. 15/640,124, Response filed Sep. 17, 2019 to Non-Final Office Action mailed May 17, 2019", 10 pgs.

"U.S. Appl. No. 15/929,483, Examiner Interview Summary mailed Jun. 6, 2022", 3 pgs.

"U.S. Appl. No. 15/929,483, Final Office Action mailed Sep. 9, 2022", 14 pgs.

"U.S. Appl. No. 15/929,483, Non Final Office Action mailed Jan. 21, 2022", 18 pgs.

"U.S. Appl. No. 15/929,483, Notice of Allowance mailed Dec. 7, 2022", 10 pgs.

"U.S. Appl. No. 15/929,483, Preliminary Amendment filed Oct. 13, 2020", 7 pgs.

"U.S. Appl. No. 15/929,483, Response filed Jun. 21, 2022 to Non Final Office Action mailed Jan. 21, 2022", 12 pgs.

"U.S. Appl. No. 15/929,483, Response filed Nov. 4, 2022 to Final Office Action mailed Sep. 9, 2022", 8 pgs.

"U.S. Appl. No. 16/192,419, Advisory Action mailed Feb. 27, 2020", 3 pgs.

"U.S. Appl. No. 16/192,419, Corrected Notice of Allowability mailed Feb. 10, 2021", 1 pg.

"U.S. Appl. No. 16/192,419, Examiner Interview Summary mailed Feb. 13, 2020", 4 pgs.

"U.S. Appl. No. 16/192,419, Final Office Action mailed Dec. 2, 2019", 29 pgs.

"U.S. Appl. No. 16/192,419, Non Final Office Action mailed Apr. 9, 2019", 26 pgs.

(56) References Cited

OTHER PUBLICATIONS

"U.S. Appl. No. 16/192,419, Non Final Office Action mailed Apr. 23, 2020", 27 pgs.
"U.S. Appl. No. 16/192,419, Notice of Allowance mailed Oct. 21, 2020", 10 pgs.
"U.S. Appl. No. 16/192,419, Response filed Feb. 3, 2020 to Final Office Action mailed Dec. 2, 2019", 13 pgs.
"U.S. Appl. No. 16/192,419, Response filed Sep. 23, 2020 to Non Final Office Action mailed Apr. 23, 2020", 11 pgs.
"U.S. Appl. No. 16/192,419, Response filed Aug. 8, 2019 to Non-Final Office Action mailed Apr. 9, 2019", 12 pgs.
"U.S. Appl. No. 16/192,419, Supplemental Notice of Allowability mailed Feb. 24, 2021", 2 pgs.
"U.S. Appl. No. 17/248,386, Preliminary Amendment filed Apr. 5, 2021", 7 pgs.
"How to Search by Image on Google", Google, [Online]. Retrieved from the Internet: <URL: http://www.wikihow.com/Search-by-Image-on-Google, (Accessed Nov. 17, 2015), 3 pgs.
"International Application Serial No. PCT/US2016/065660, International Preliminary Report on Patentability mailed Jun. 21, 2018", 13 pgs.
"International Application Serial No. PCT/US2016/065660, International Search Report mailed May 2, 2017", 7 pgs.
"International Application Serial No. PCT/US2016/065660, Invitation to Pay Add'l Fees and Partial Search Rpt mailed Mar. 3, 2017", 6 pgs.
"International Application Serial No. PCT/US2016/065660, Written Opinion mailed May 2, 2017", 13 pgs.
Castelluccia, Claude, et al., "EphPub: Toward robust Ephemeral Publishing", 19th IEEE International Conference on Network Protocols (ICNP), (Oct. 17, 2011), 18 pgs.
Chetlur, Sharan, et al., "cuDNN: Efficient Primitives for Deep Learning", arXiv:1410.0759v3, (Dec. 18, 2014), 9 pgs.
Fajman, "An Extensible Message Format for Message Disposition Notifications", Request for Comments: 2298, National Institutes of Health, (Mar. 1998), 28 pgs.
Girgensohn, Andreas, et al., "Leveraging Face Recognition Technology to Find and Organize Photos", Proc. of the 6th ACM SIGMM Intl. Workshop on Multimedia Information Retrieval, (Oct. 2004), 8 pgs.
Huynh, Loc N, et al., "DeepSense: A GPU-based Deep Convolutional Neural Network Framework on Commodity Mobile Devices", Proc. of the ACM Workshop on Wearable Systems and Applications, (2016), 6 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
Li, H., et al., "Interactive Multimodal Visual Search on Mobile Device", IEEE Transactions on Multimedia, vol. 15, No. 3, (Apr. 2013), 594-607.
Long, Jonathan, et al., "Fully Convolutional Networks for Semantic Segmentation", IEEE Conference on Computer Vision and Pattern Recognition (CVPR), Boston, MA, [Online] Retrieved from the internet: <https://openaccess.thecvf.com/content_cvpr_2015/papers/Long_Fully_Convolutional_Networks_2015_CVPR_paper.pdf>, (Jun. 2015), 10 pgs.
Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.
Sawers, Paul, "Snapchat for iOS Lets You Send Photos to Friends and Set How long They're Visible For", [Online] Retrieved from the Internet: <URL: https://thenextweb.com/apps/2012/05/07/snapchat-for-ios-lets-you-send-photos-to-friends-and-set-how-long-theyre-visible-for/>, (May 7, 2012), 5 pgs.
Shein, Esther, "Ephemeral Data", Communications of the ACM, vol. 56, No. 9, (Sep. 2013), 3 pgs.
Vaas, Lisa, "StealthText, Should You Choose to Accept It", [Online] Retrieved from the Internet: <URL: http://www.eweek.com/print/c/a/MessagingandCollaboration/StealthTextShouldYouChoosetoAcceptIt>, (Dec. 13, 2005), 2 pgs.
Vallet, Alexis, et al., "A Multi-Label Convolutional Neural Network for Automatic Image Annotation", Journal of Information Processing, vol. 23, No. 6, (Nov. 2015), 10 pgs.
"U.S. Appl. No. 15/009,402, Response filed Jun. 22, 2020 to Final Office Action mailed Feb. 28, 2020", 10 pgs.
"U.S. Appl. No. 15/640,124, Response filed Jun. 30, 2020 to Non Final Office Action mailed Apr. 30, 2020", 12 pgs.
"U.S. Appl. No. 15/008,956, Response filed Aug. 3, 2020 to Final Office Action mailed May 1, 2020", 10 pgs.
"U.S. Appl. No. 15/009,402, Non Final Office Action mailed Aug. 5, 2020", 23 pgs.
"U.S. Appl. No. 15/008,956, Non Final Office Action mailed Aug. 21, 2020", 30 pgs.
"U.S. Appl. No. 15/640,124, Notice of Allowance mailed Sep. 24, 2020", 8 pgs.
"U.S. Appl. No. 15/009,402, Response filed Nov. 5, 2020 to Non Final Office Action mailed Aug. 5, 2020", 11 pgs.
"U.S. Appl. No. 15/009,402, Final Office Action mailed Dec. 30, 2020", 30 pgs.
"U.S. Appl. No. 15/008,956, Response filed Feb. 22, 2021 to Non Final Office Action mailed Aug. 21, 2020", 10 pgs.
"U.S. Appl. No. 15/008,956, Final Office Action mailed Apr. 16, 2021", 36 pgs.
"U.S. Appl. No. 15/009,402, Response filed Apr. 30, 2021 to Final Office Action mailed Dec. 30, 2020", 11 pgs.
"U.S. Appl. No. 16/676,089, Restriction Requirement mailed Apr. 30, 2021", 6 pgs.
"U.S. Appl. No. 16/676,089, Response filed Jun. 30, 2021 to Restriction Requirement mailed Apr. 30, 2021", 2 pgs.
"U.S. Appl. No. 15/009,402, Non Final Office Action mailed Jul. 9, 2021", 25 pgs.
"U.S. Appl. No. 16/676,089, Examiner Interview Summary mailed Jul. 16, 2021", 2 pgs.
"U.S. Appl. No. 16/676,089, Non Final Office Action mailed Jul. 26, 2021", 8 pgs.
"U.S. Appl. No. 15/008,956, Response filed Sep. 16, 2021 to Final Office Action mailed Apr. 16, 2021", 11 pgs.
"U.S. Appl. No. 15/008,956, Non Final Office Action mailed Oct. 4, 2021", 45 pgs.
"U.S. Appl. No. 16/676,089, Response filed Oct. 26, 2021 to Non Final Office Action mailed Jul. 26, 2021", 8 pgs.
"U.S. Appl. No. 15/009,402, Response filed Dec. 9, 2021 to Non Final Office Action mailed Jul. 9, 2021", 11 pgs.
"U.S. Appl. No. 16/676,089, Notice of Allowance mailed Jan. 12, 2022", 8 pgs.
"U.S. Appl. No. 15/009,402, Final Office Action mailed Jan. 27, 2022", 29 pgs.
"U.S. Appl. No. 15/008,956, Response filed Apr. 4, 2022 to Non Final Office Action mailed Oct. 4, 2021", 13 pgs.
"U.S. Appl. No. 15/009,402, Response filed Jun. 27, 2022 to Final Office Action mailed Jan. 27, 2022", 11 pgs.
"U.S. Appl. No. 15/009,402, Non Final Office Action mailed Jul. 21, 2022", 33 pgs.
"U.S. Appl. No. 15/008,956, Final Office Action mailed Jul. 29, 2022", 51 pgs.
"U.S. Appl. No. 15/008,885, Response filed Aug. 22, 2022 to Final Office Action mailed Mar. 21, 2022", 11 pgs.
"U.S. Appl. No. 15/008,885, Non Final Office Action mailed Sep. 8, 2022", 52 pgs.
"U.S. Appl. No. 17/744,472, Preliminary Amendment filed Sep. 21, 2022", 7 pgs.
"U.S. Appl. No. 15/008,956, Response filed Nov. 18, 2022 to Final Office Action mailed Jul. 29, 2022", 14 pgs.
"U.S. Appl. No. 15/009,402, Response filed Nov. 21, 2022 to Non Final Office Action mailed Jul. 21, 2022", 12 pgs.
"U.S. Appl. No. 15/008,956, Non Final Office Action mailed Dec. 8, 2022", 22 pgs.
"U.S. Appl. No. 15/008,885, Response filed Dec. 8, 2022 to Non Final Office Action mailed Sep. 8, 2022", 12 pgs.

(56) References Cited

OTHER PUBLICATIONS

"U.S. Appl. No. 15/009,402, Final Office Action mailed Dec. 22, 2022", 34 pgs.

"U.S. Appl. No. 15/008,885, Final Office Action mailed Feb. 3, 2023", 54 pgs.

"U.S. Appl. No. 15/008,885, Response filed Apr. 3, 2023 to Final Office Action mailed Feb. 3, 2023", 13 pgs.

"U.S. Appl. No. 15/008,885, Advisory Action mailed Apr. 21, 2023", 4 pgs.

"U.S. Appl. No. 15/008,885, Response filed May 2, 2023 to Advisory Action mailed Apr. 21, 2023", 13 pgs.

"U.S. Appl. No. 15/008,885, Non Final Office Action mailed May 19, 2023", 56 pgs.

"U.S. Appl. No. 17/248,386, Notice of Allowance mailed Jul. 7, 2023", 10 pgs.

"U.S. Appl. No. 15/008,885, Advisory Action mailed Jan. 18, 2024", 3 pgs.

"U.S. Appl. No. 15/008,885, Final Office Action mailed Oct. 16, 2023", 59 pgs.

"U.S. Appl. No. 15/008,885, Response filed Sep. 19, 2023 to Non Final Office Action mailed May 19, 2023", 12 pgs.

"U.S. Appl. No. 15/008,885, Response filed Dec. 18, 2023 to Final Office Action mailed Oct. 16, 2023", 14 pgs.

"U.S. Appl. No. 17/248,386, Amendment under 37 C.F.R. 1.312 filed Oct. 6, 2023", 6 pgs.

"U.S. Appl. No. 17/248,386, Notice of Allowability mailed Sep. 7, 2023", 7 pgs.

"U.S. Appl. No. 17/248,386, PTO Response to Rule 312 Communication mailed Oct. 20, 2023", 2 pgs.

"U.S. Appl. No. 15/008,885, Non Final Office Action mailed Apr. 25, 2024", 58 pgs.

"U.S. Appl. No. 15/008,885, Response filed Apr. 16, 2024 to Advisory Action mailed Jan. 18, 2024", 14 pgs.

"U.S. Appl. No. 15/008,885, Final Office Action mailed Oct. 15, 2024", 58 pgs.

"U.S. Appl. No. 15/008,885, Response filed Sep. 25, 2024 to Non Final Office Action mailed Apr. 25, 2024", 12 pgs.

"U.S. Appl. No. 15/008,885, Examiner Interview Summary mailed Jan. 27, 2025", 2 pgs.

"U.S. Appl. No. 15/008,885, Notice of Allowance mailed Mar. 14, 2025", 17 pgs.

"U.S. Appl. No. 15/008,885, Response filed Feb. 17, 2025 to Final Office Action mailed Oct. 15, 2024", 13 pgs.

* cited by examiner

PRIORITIZED DEVICE ACTIONS TRIGGERED BY DEVICE SCAN DATA

CLAIM OF PRIORITY

This application is a continuation of U.S. patent application Ser. No. 15/929,483, filed on May 5, 2020, which is a continuation of U.S. patent application Ser. No. 15/265,672, filed on Sep. 14, 2016, which claims the benefit of priority to U.S. Provisional Application Ser. No. 62/218,965, filed on Sep. 15, 2015 and U.S. Provisional Application Ser. No. 62/358,461, filed on Jul. 5, 2016, which applications are incorporated herein by reference in their entireties.

TECHNICAL FIELD

Embodiments of the present disclosure relate generally computing systems and image processing to tag or label content and to perform prioritized device actions such as image searching in response to scanning data by a device.

DETAILED DESCRIPTION

Figure 1:
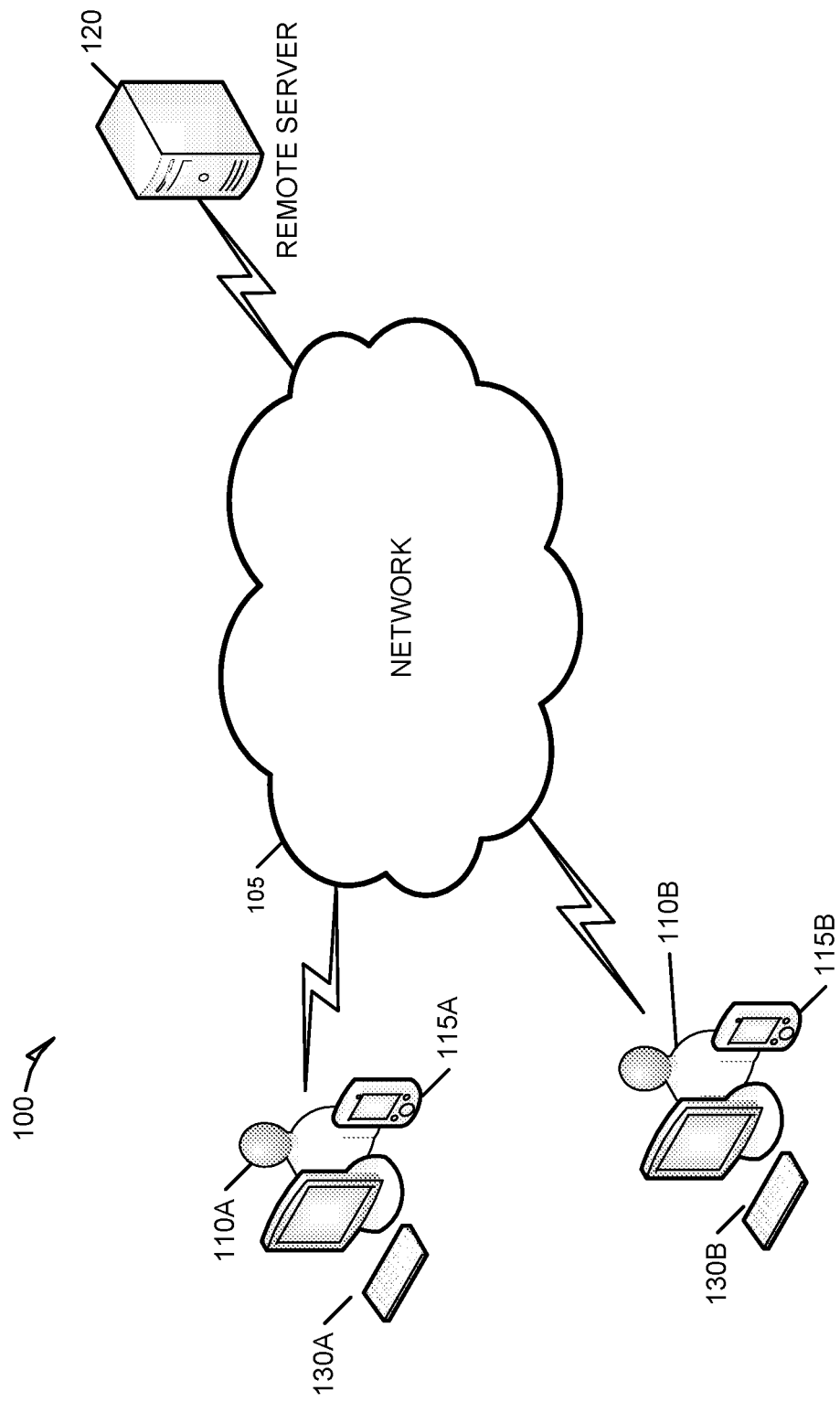
FIG. 1 is a diagram illustrating a networked system that may be used for communications within a system that supports messaging and scanning according to some example embodiments.

The description that follows includes details of devices and methods related to automatic device actions in response to device scan data. In the following description, for the purposes of explanation, numerous specific details are set forth in order to provide an understanding of various embodiments. It will be evident, however, that additional embodiments that are not specifically described are also possible in accordance with the present innovations. In general, well-known instruction instances, protocols, structures, and techniques are not necessarily shown in detail.

Smart phones, tablet computers, laptop computers, and other such devices include many different types of sensors and input/output modules capable of gathering different types of information about the device's surroundings. Embodiments described herein use such sensors and modules to "scan" the environment around the device to check for certain information which will trigger a particular response based on system settings. This scan can be initiated from an image capture interface of an ephemeral message communication system in a way that provides a simple interface for multiple triggered actions as well as a fast response time.

For example, in one embodiment, a messaging application operating on a smart phone presents an image capture and scanning interface to a user. The interface displays a camera sensor image, along with an interface to initiate capture of an image or a video clip. In addition to the image capture portions of the interface, a scanning input area is included. When the scanning input area is pressed and held (e.g. a scanning input command is received) a scan is initiated to capture data from multiple sensors and or I/O modules. The scan information is then analyzed for particular data patterns. This analysis may be performed by the device that captured the scan data, by a remote server, or by both the local device and a remote server. Examples of particular data patterns include bar codes, quick response codes, particular songs, logos in images, objects recognized in images, locations registered with a system, wireless access point names, or any other information that may be set within a system and matched with scan data.

When a matching pattern is identified, a user interface update is provided in a portion of the image capture interface. The user interface update may notify the user that an action has been taken in response to an identified data pattern, or may allow the user to make a selection to take an additional action in response to the identified data pattern.

In one example embodiment, if a brand logo, a business location, or music associated with a particular business is identified in a scan, an offer associated with the business may be presented to the user of the device. In other embodiments, particular content in an image may be used to provide specialized image filters to a user. Many other types of actions may be taken in response to a match of scan data to particular data patterns, as described further below.

In another example embodiment, a scan operation may capture an image of a cat. The scan data including the image of the cat may be processed to extract the keyword "cat" from the scan data. The keyword "cat" is then compared against registered keywords to identify actions associated with the keyword. The system finds a "cat image transform" associated with this keyword, and unlocks an image capture interface option. Subsequent images taken using the image capture interface may use this option to filter pictures of people to look like cats.

In another specific example, a scan operation may match a particular song with the audio of the scan. This match may be used to identify an action associated with the singer of the song, such as an automatic account connection with the singer, or communication of an image of the singer to an account of the user performing the scan.

If multiple matches with associated actions are identified in the scan data, the response actions may be prioritized to prevent a user interface from being cluttered with an excessive number of actions. The prioritization may also prevent the device and the user from being overwhelmed with a large number of actions in response to the scan. In different embodiments, different methods for prioritizing such actions may be used, and different numbers of actions may be allowed based on a variety of different factors. In one embodiment, data patterns in the system that are used for matching are classified by type, with different types of data patterns given different priorities. For example, a bar code or quick response code in an image may be given priority over an audio pattern for a song. Both of these may be given priority over an action associated with a location. Patterns sharing a type may be prioritized based on user preferences, user histories, the total context indicated by the scan data and all identified patterns, or any other such prioritization scheme set within the system.

If no particular data patterns are matched by the system, a default action may be set. In some embodiments, for example, a default action may be an image search based on an image captured by a camera module during the scan operation. In such an embodiment, a set of image search results are provided to the user. The search results may, for example, be accessible via a portion of the image capture interface used for priority.

A "scan" as described herein may simply capture a single initial set of data from each sensor used. A scan may also capture data from sensors over time, such that scan results and pattern matches may be made and updated over time. If a scan interface is selected and held for 10 seconds, for example, the scan may capture multiple images in addition to sound information and other sensor information. Priority actions and any searches, such as image searches, may be initiated while the scan is ongoing, with the priority order and any search results updated and refined as the scan proceeds.

FIG. 1 is a diagram illustrating a networked system 100 that may be used for communications within a system that supports messaging and scanning according to some example embodiments. The networked system 100 is configured to transmit messages between user devices such as mobile devices 115 or other client devices 130 over a network 105 (e.g., the Internet). The mobile devices 115 may comprise smart phones, network-enabled tablets, laptop computers, phablets, vehicle-integrated computers, wearable devices, or any other such mobile computing machines which include sensors and input/output modules that may be used to scan the environment of the devices. The other client devices 130 may be more static client devices such as desktop computers, home network devices such as appliances or televisions, or any other such computing devices. These devices include applications, modules, and/or circuitry to enable messages, scan data, pattern data, information related to device actions, and any other information to be communicated between the various devices and remote server 120.

In some embodiments, the remote server 120 enables communication between devices, and may store copies of scan data, pattern data, or any other such data. In some embodiments, any user data generated as part of a device scan may be stored in a non-durable memory of the remote server 120 for a time period before being copied to a durable memory so that ephemeral information generated by a scan that is not intended for long term storage may be deleted quickly.

Figure 2A:
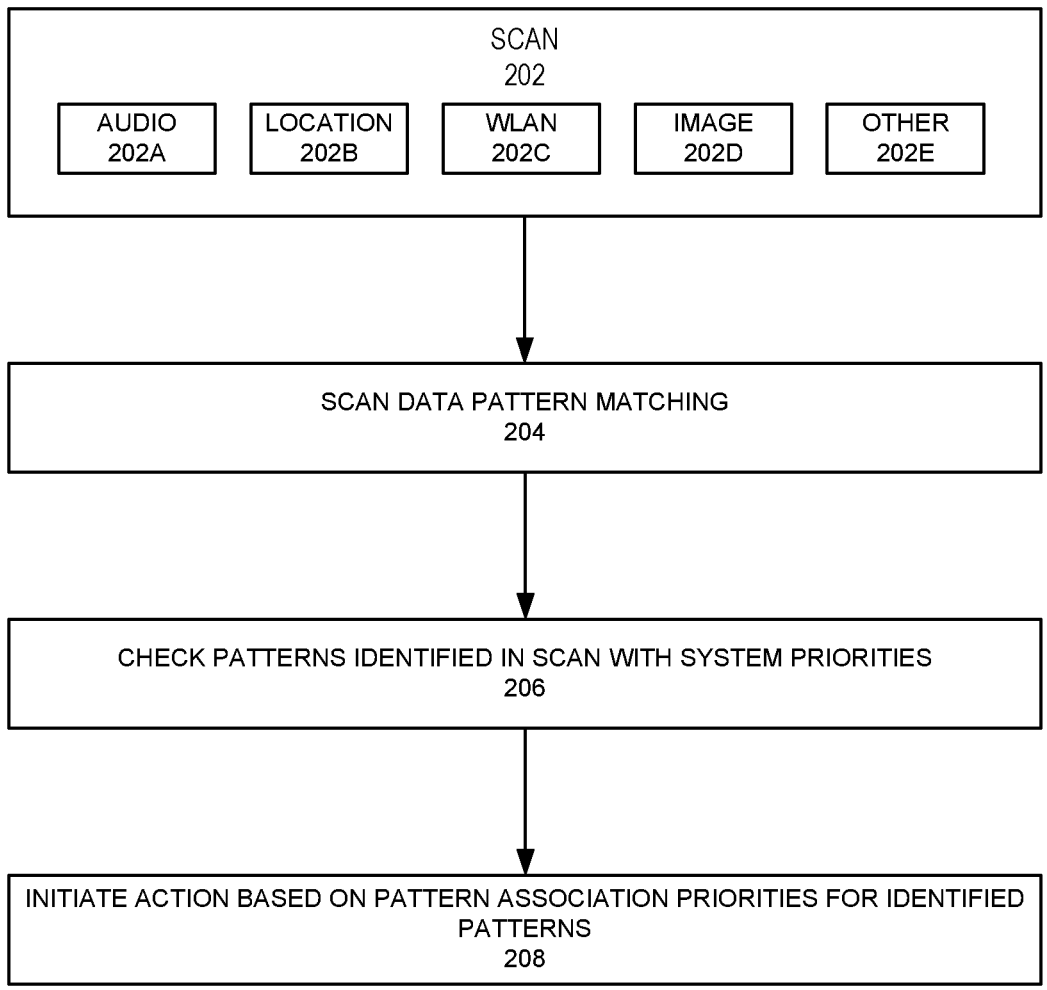
FIG. 2A describes aspects of device actions triggered by device scan data according to some embodiments.

FIG. 2A then describes aspects of device actions triggered by device scan data according to some embodiments. In operation 202, a scan is performed at a device such as device 115A. The scan may involve creation of multiple different types of scan data, including audio data 202A, location data 202B, wireless local area network (WLAN) data 202C, image data 202D, or other data 202E. Audio data 202A may be any data recorded by a microphone at the device, and may include data from sound output by a speaker of the device performing scan 202. Location data 202B may include any location data from a device, including network assisted location information, global positioning system (GPS) or global navigation satellite system (GNSS) data, accelerometer data, map data, or any other such data related to location and movement of the device performing the scan. Wireless LAN data may include information about available wireless connections on any number of different wireless protocols, including Bluetooth signals, near field communication signals, Wi-Fi signals operating according to Institute of Electrical and Electronic Engineering (IEEE) communication standards, or any other such signals. For example, in some environments, a business may offer a device access to an access point for network connectivity, with the access point having an identifier that describes the business. The identifier may be used as scan data, and may be matched to the business name with an associated triggered action as described herein. Image data 202D may be images, video clips, or other information from a camera within the device performing the scan. Other data 202E may be any information generated by any sensor or I/O component of the device performing the scan.

As scan data is captured, it may be processed in a number of different ways, and may then be matched against system patterns in operation 204. In some embodiments, this may be as simple as matching text against a stored text pattern. For example, if an identifier for an access point includes the word "coffee" and the word "coffee" is a pattern in the system for matching, then a match is identified. Other matches of scan data against system patterns may be more complex. For example, bar code, quick response codes, or Snap codes are complex patterns that may be identified from image data. Pattern matching in operation 204 may identify that such codes exist in image data 202D, and may then interact with a server 220 to identify a specific product or action associated with the exact code in the image. Audio data 202A may be compared against known song or other sound patterns to identify a particular song name or artist name.

If multiple patterns are identified during scan data pattern matching 204, then in operation 206, the patterns identified are organized against a set of priorities identified in a system, and in operation 208, actions are initiated based on the pattern association priorities for any identified patterns. For example, a user may initiate a scan that captures multiple frames of image data with audio data and location data. The images may be processed to identify information including snow skis, branded clothes, and a logo for a coffee shop. The location information may be processed to identify a location associated with a particular ski resort. The audio information may be processed to identify a particular song by a particular artist. Each of these may be associated with a system pattern having an associated action. For example, the identification of scan data including (1) skis, (2) a clothing brand, (3) a coffee shop logo, (4) a ski resort location, and (5) audio by the artist, may be associated with an action such as a link to additional information or an offer associated with the individual pattern. Rather than performing all the actions at once in respond to the scan, the system may process each match according to a priority. Additional aspects related to system priorities are discussed below, particularly with respect to FIG. 3.

Figure 2B:
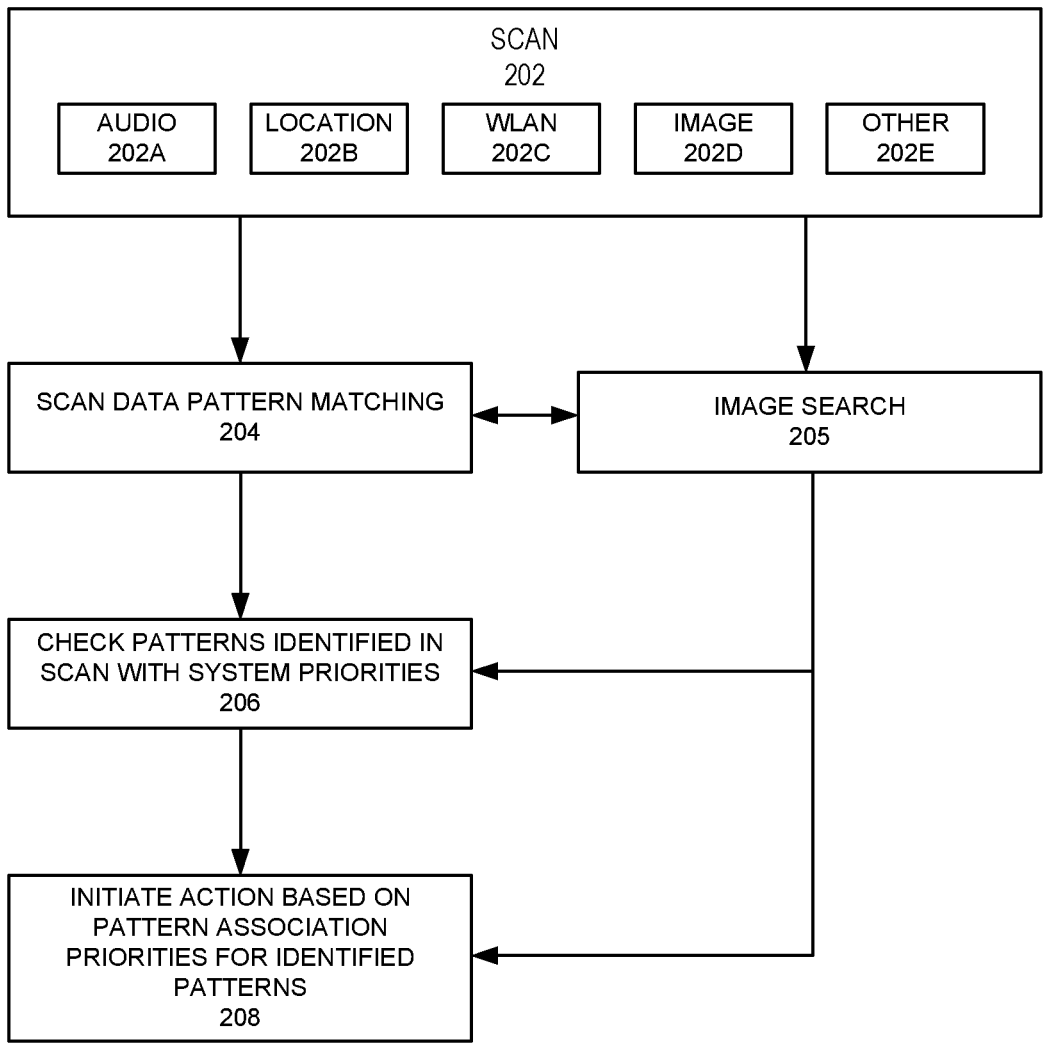
FIG. 2B describes aspects of device actions triggered by device scan data according to some embodiments.

In some embodiments, image search using images from scan 202 is part of an analysis of scan data performed to assist with scan data pattern matching 204. In other embodiments, however, image search may be a separate operation performed automatically as part of scan 202 and used in different ways as part of a system for prioritized device actions in response to device scan data. FIG. 2B illustrates another example embodiment with a separate image search service. The image search operation 205 may be used to enhance the pattern matching a system actions performed by a client device working with a server to implement a scan system as described herein. Image searching refers to systems which accept images as an input, and output related information. Such systems may return either keyword information describing the information in the image, other similar images, or both. For example, an image search system may accept an image of a cat, and may provide the word "cat" as a response along with other images of similar cats. Some embodiments of image search may include other more detailed information, such as a breed of the cat, a color of the cat, or other detailed information about the environment of the image.

Any scan system described herein may use an independent image search system to process images, generate output information about the images from the scan, and then identify actions to be taken based on the output information from the scan images. As shown in FIG. 2B, image search may be used in various ways in different embodiments of a scan system. In some embodiments, an image search operation 205 may be initiated automatically as part of a scan. In such an embodiment, one or more images may be captured as part of a scan, and sent to an image search service automatically. The scan may select an image from multiple captured images based on quality metrics associated with the image, or may simply capture an initial image. If the scan proceeds for a certain period of time, or the images received as part of the scan are determined to vary by some threshold amount, additional images may be used to either update the image search or to perform multiple image searches as part of a single scan. Some or all image search analysis may be performed locally on a device performing a scan, some image search analysis may be performed on a remote server such as server 220, or some image search analysis may be performed by a third party search server 503. To conserve resources, images submitted to a search service may be compressed using various compression algorithms, so that images may be communicated in a compressed format such as graphics interchange format (GIF), joint photographic experts group (JPEG) or other such image formats.

In various embodiments, output information from image search 205 may be used both to generate scan information that is matched to system patterns, to prioritize identified matches by providing additional context information about the scan data, and to generate a search result that may be presented to a device user as an action resulting from the scan. Automatic initiation of image search 205 from an image capture interface such as the interface illustrated by FIG. 4B may particularly provide responsiveness benefits, where an image search may be initiated within a multipurpose interface, and results provided quickly within that interface.

Figure 3:
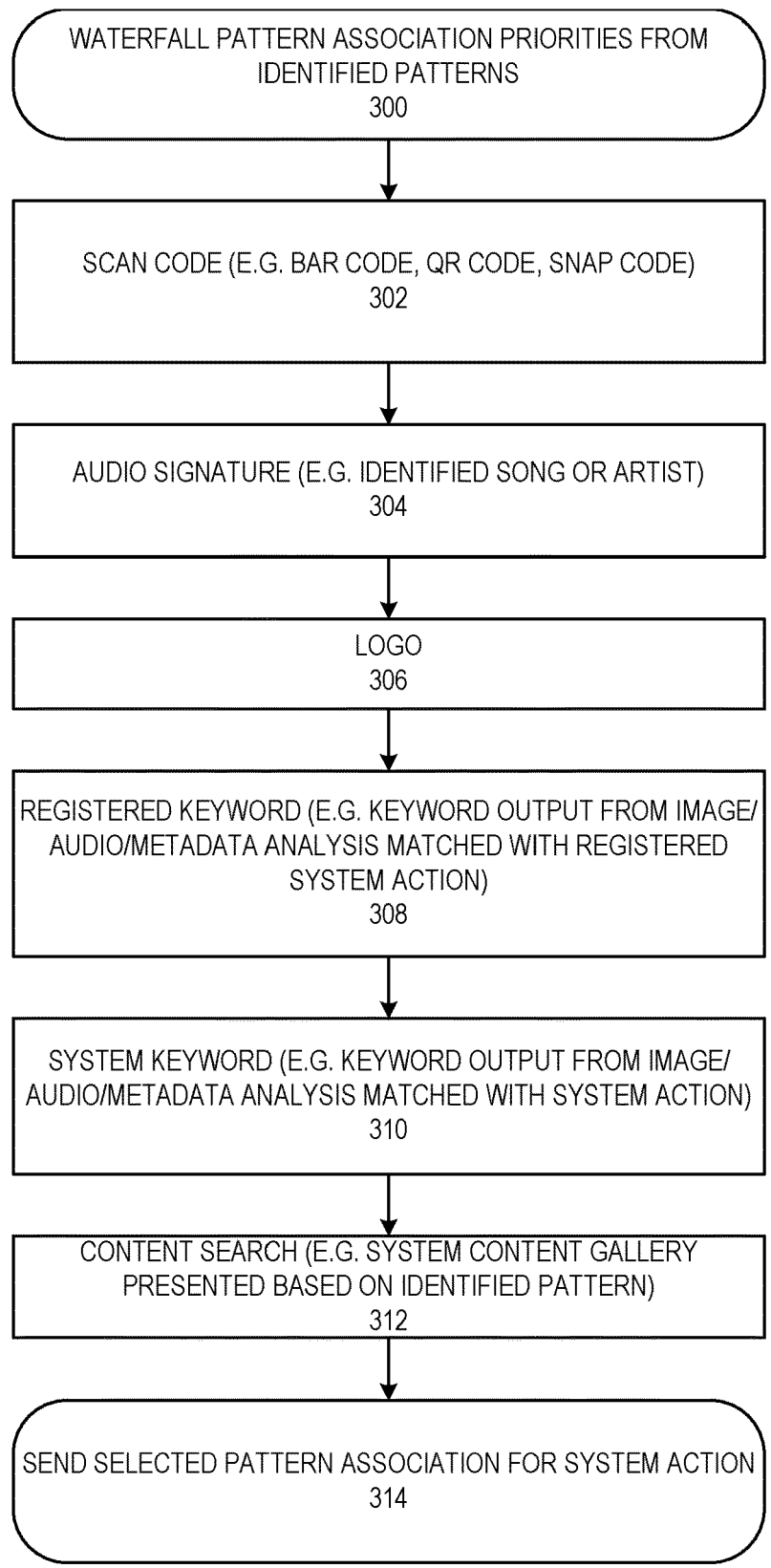
FIG. 3 illustrates one example of a method for prioritizing actions based on the scan data type or match type associated with the corresponding action in accordance with some embodiments

FIG. 3 illustrates one example of a method for prioritizing actions based on the scan data type or match type associated with the corresponding action. The method of FIG. 3 may be an implementation of operation 206, the actions initiated in operation 208 selected based on the priority discussed in FIG. 3. Operation 300 of FIG. 3 begins with any patterns from a set of scan data identified based on the set of patterns in a system. The identified patterns are then prioritized based on the waterfall method described in FIG. 3. In other embodiments, other methods of prioritizing identified patterns may be used.

The first priority is any scan code 302 identified in the scan data. This includes scan codes such as bar codes, Snap codes, quick response codes, or other such codes. In some embodiments, an identified scan code size is compared with a threshold percentage of an image and meets or exceeds the threshold in order to be recognized as a scan code. This prevents an incidental scan code in the background image from being prioritized, but also provides a quick priority action based on the presence of a scan code if the scan code is the predominant image during a scan operation. If such a scan code is associated with a priority action, the system will automatically communicate with a server associated with the scan code in order to identify the particular code pattern, and to perform an action based on the particular code pattern in the scan code. Such actions may include generating a message associated with a product or event, generating a calendar item in a device calendar, providing a coupon based on the particular code pattern, automatic installation of software on a device, or any other such action indicated by a particular code pattern in a scan code. If multiple scan codes are identified during a scan operation, the system may request a user confirmation of the preferred scan code, or may ignore the scan codes based on a system assumption that a user would not image multiple scan codes if attempting to scan a particular scan code.

A second level priority may then be provided to audio signature 304 pattern matches. Such matches may include matching audio scan data to a particular song or artist using a database of songs. A priority action in response to such an audio signature 304 match may be providing a link to information about the song or the artist. In some embodiments, an entity associated with the song or artist may select a particular action to be taken in response to the audio signature 304 pattern match. This may include automatically making a messaging system or social network connection with an account associated with the artist, providing promotional codes to the device or an account associated with the device, or any other such action that may be approved by the system or a user's settings.

A third level priority may be associated with an identified logo 306. This may include any trademark or brand pattern that is registered with the system, and may include trademarked text, image, or audio pattern identified in association with any sensor or I/O module of the device performing the scan. In some embodiments, this may include logos 306 identified by a separate image search system and provided to the scan system. The action associated with such a logo 306 pattern may, as described above for audio patterns, simply be a link to additional information associated with the logo, or may be any structured actions selected by a system operator or selected by an entity associated with the logo.

A fourth level priority may be associated with a registered keyword 308. As mentioned above, various types of analysis of scan data may result in keywords. For example, an image search process may result in keywords describing the image. Similarly, analysis of audio may provide keywords describing the audio, including music styles, sound types (e.g. recognized vehicle or animal sounds), or other text descriptions of audio information. Further, any other scan data may include or be associated with key words that may be registered with a system. This may include paid advertisement associations, where a third party pays to have a system action associated with a keyword. In some embodiments, a user may approve certain types of actions or messages to be presented in an image capture user interface and may deny other actions. In some embodiments, actions associated with registered keywords are limited to messages or links presented within an action are of the image capture user interface. In other embodiments, additional actions such as image filters or transformations may be provided as an action in response to scan data associated with a pattern. A fifth level priority is a system keyword 310. These may be similar to registered keywords, but are keywords set by the system operator in order to provide actions to system users.

Third party entities (e.g., merchants, restaurants, individuals, etc.) may, in some example embodiments, have keywords included in the system patterns that are matched against scan data. For example, a restaurant at a particular location may wish to have their restaurant name and logo included with a system action of their selection. According to one example embodiment, such third party entities may bid (or otherwise purchase opportunities) to have a particular keyword and associated action.

In some embodiments, this may operate with match selection systems such as match selection system 521 described below. The match selection system operates at a server and generates pattern associations that may be used by a scan application. This includes audio and visual content or visual effects that can be applied to augment a media item at a mobile device as part of a system action initiated in response to scan data. The media item may be any information used as part of a system action initiated in response to a match of a pattern to scan data. The match selection system may include various match publication platform elements.

In the user-based match publication platform, the match selection system provides a Graphical User Interface (GUI) for a user to select keywords or other patterns that may be matched to scan data. The GUI may also be used to upload content or pattern information, select keywords, or select a geolocation on a map. For example, the user may upload a logo and define boundaries on the map to identify a particular geolocation associated with the logo. The user may also select an action to be initiated with the logo and geolocation are matched with scan data. Once the user submits the logo and identifies the particular geolocation, the match selection system generates a pattern that may be matched to scan data that includes the logo and the geolocation. A match in scan data with the logo and geolocation then initiates the system actions specified by the third party user. In various embodiments, permissions are granted to a user to generate the pattern and associated system action based on a bid, payment, or other access action within the system. In some embodiments, the match selection system provides a GUI for merchants to provide match patterns, including uploading content, selecting geolocations on a map, and submit bids for the corresponding geolocations, keywords, image matches, audio matches, or any other pattern that may be matched in a system along with content to be used in a resulting action. A bidding process determines the merchant with the highest bid amount. That merchant can then exclude other merchants from selected keywords, geolocations, or other associations or matches that may be made by the scan system. A sixth level priority may be a content search 312. Such a search may be based on various combinations of portions of the scan data, or based on all of the scan data. This may include an image search, or a general search based on image data, audio data, keyword data identified by an analysis of the scan data, or any other such search. The data searched may include images in a gallery created by or associated with the user. This may also include galleries or sets of images and video clips generated as part of a messaging system or social networking system. In other embodiments, a third party search system such as an image search may be used as part of content search 312. An action generated in response to such a content search may be a list of images, a list of galleries made up of content associated with the scan data, a list of content elements including image, video, audio, location, or other content elements.

FIG. 3 thus describes one waterfall flow for prioritizing certain types of data patterns. For scans that include multiple patterns for a single data pattern type, various different types of priority may be used. A user may input preferences related to subject matter content. A scoring system may be used based on the prevalence of certain result types within all of the scan data. Thresholds may be used to filter out certain data patterns. History data for user system usage or storage may be used to prioritize certain topics or data pattern types.

Similarly, in some embodiments, action priority may be based on aspects of scan data other than a pattern type or scan data type. For example, subject or content of certain scan data may be used for priority. Some systems may include user settings to select certain data patterns or action types for priority. Thus, in various embodiments, automatic actions initiated in response to scan data may be prioritized in a variety of different ways.

Figure 4A:
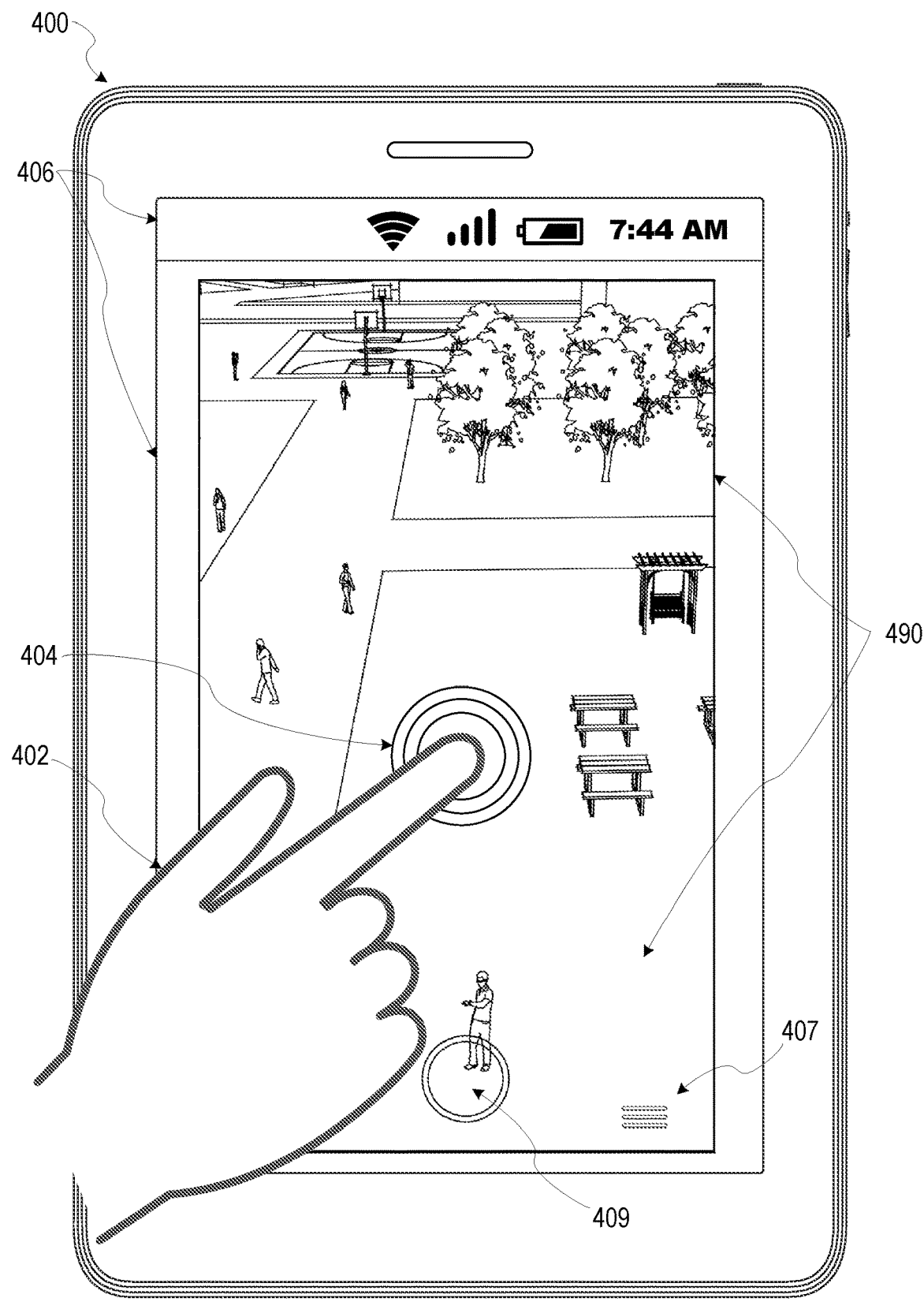
FIG. 4A shows aspects of a user interface for a device that may be used as part of a scan system as described herein in accordance with some embodiments.
Figure 4B:
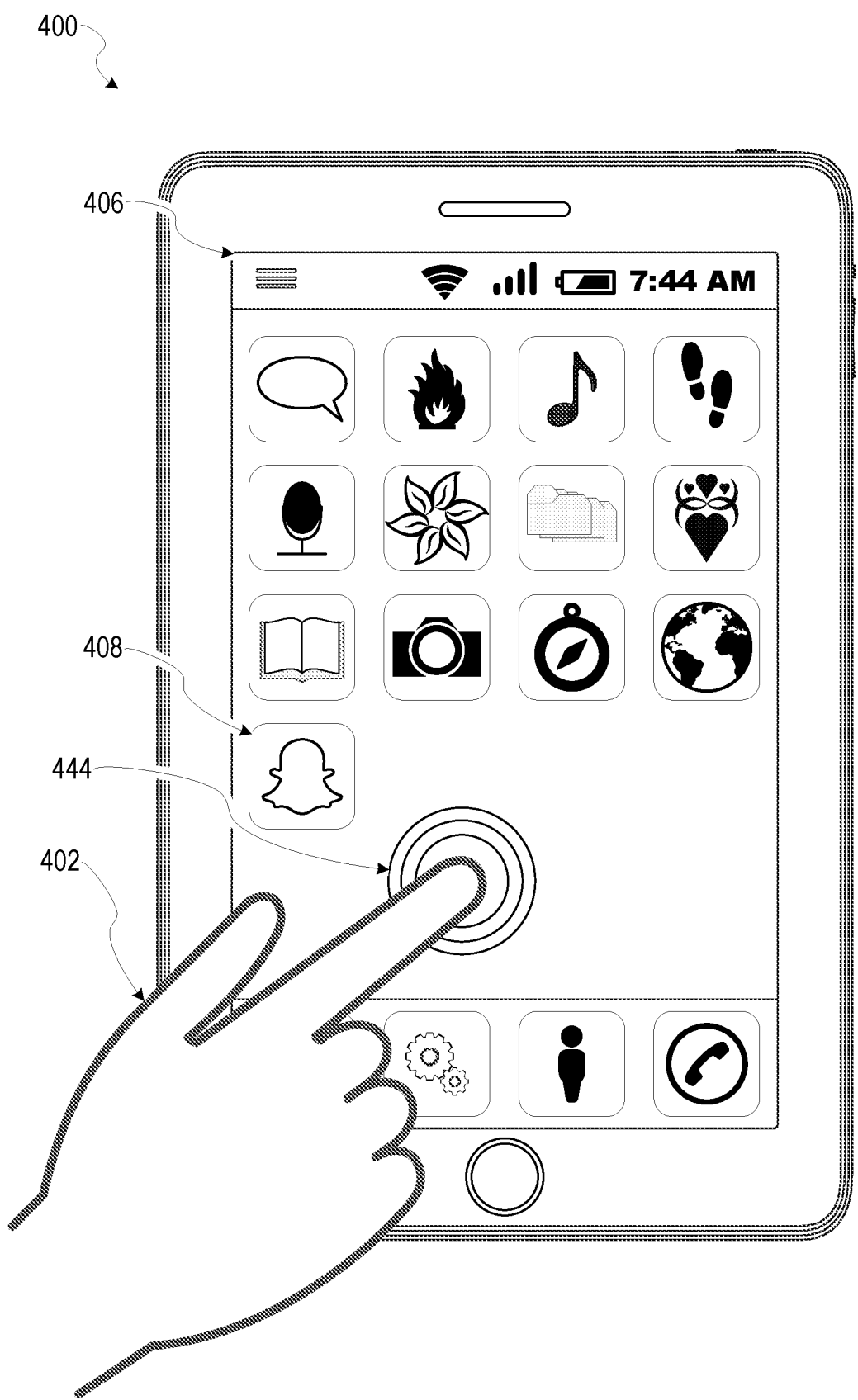
FIG. 4B shows aspects of a user interface for a device that may be used as part of a scan system as described herein in accordance with some embodiments.

FIGS. 4A-B show aspects of a user interface for a device 400 that may be used as part of a scan system as described herein. FIG. 4A shows message device 400 with display area 406, which is a touch screen operating as both an output display and an input device. In addition to various user interface elements, display area displays image 490, which includes both image data from a camera of device 400 as well as image capture user interface elements. Interface 407, for example, provides input options to send messages. Interface element 409 may be used to initiate capture of images or video clips using the camera. Pressing and holding in a scan area 404 by a user 402 results in a scan being initiated, with a pulsing image indicating that the scan is ongoing with additional scan data being captured, including frames or images from display image 490 as it is updated with the device moving.

FIG. 4B illustrates an example mobile device 400 executing a mobile operating system, consistent with some embodiments. In one embodiment, the mobile device 400 includes a touch screen operable to receive tactile data from a user 402. For instance, the user 402 may physically touch the mobile device 400 at a touch point 444, and in response to the touch, the mobile device 400 may determine tactile data such as touch location, touch force, or gesture motion. In various example embodiments, the mobile device 400 displays a home screen 406 (e.g., Springboard on IOS™) operable to launch applications or otherwise manage various aspects of the mobile device 400. In some example embodiments, the home screen 406 provides status information such as battery life, connectivity, or other hardware statuses. The user 402 can activate user interface elements by touching an area occupied by a respective user interface element. In this manner, the user 402 interacts with the applications of the mobile device 400. For example, touching the area occupied by a particular icon included in the home screen 406 causes launching of an application corresponding to the particular icon.

Many varieties of applications (also referred to as "apps") can be executing on the mobile device 400, such as native applications (e.g., applications programmed in Objective-C, Swift, or another suitable language running on IOS™, or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 400 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 400 includes a social messaging app 408 such as SNAPCHAT® that, consistent with some embodiments, allows users to exchange ephemeral messages that include media content. In this example, the social messaging app 408 can incorporate aspects of embodiments described herein, including the image capture interface of FIG. 4A as part of display area 406 with interface inputs available at scan area 404 to initiate a scan process.

Figure 5:
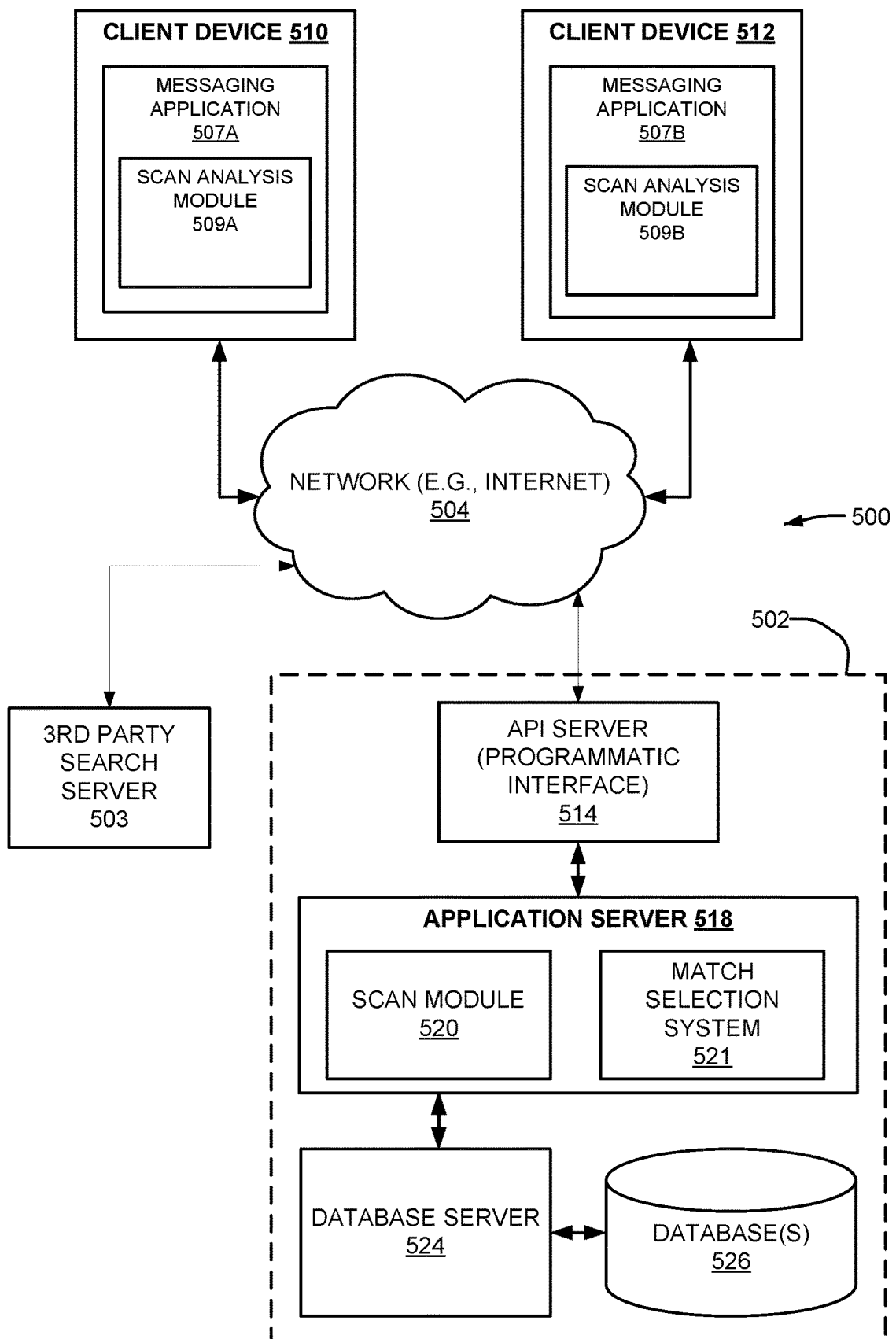
FIG. 5 is a diagram illustrating a network system that may be used for ephemeral communications according to some example embodiments.

FIG. 5 is a diagram illustrating a network system 500 that may be used for ephemeral communications according to some example embodiments. The network system 500 has a client-server architecture configured for exchanging data over a network, according to one embodiment. Although the network system 500 is illustrated herein as having a client-server architecture, other embodiments may include other network architectures, such as peer-to-peer or distributed network architectures.

The network system 500 includes a client device 510 and a client device 512 communicatively coupled to each other and to a data exchange platform 502 via a network 504 (e.g., the Internet). The data exchange platform 502, in an example, includes a scan module 520. Scan module 520 may further include modules or component structures for analyzing scan data or pattern information received from one or more client devices 510, 512, for communicating with client devices 510, 512, and for interacting with a database server 524 as part of the analysis and storage of the analysis and information sent to and from client devices 510, 512. For example, a message transmission module may manage communications, and a scan data analysis module may provide server-side processing and analysis functionality via the network 504 to one or more clients. Although the scan module 520 is described as residing on a server (e.g., application server(s) 518) in some embodiments, in other embodiments all of the functions scan module 520 may be provided by a client device such that all processing of scan data is performed locally on the client device that captures the scan data. The one or more clients may include users that use the network system 500 to exchange data over the network 504. These operations may include transmitting, receiving (communicating), and processing data to, from, and regarding content and users of the network system 500. The data may include, but is not limited to, content and user data such as user profiles, messaging content, messaging attributes, client device information, and geolocation information, among others.

Some embodiments include a match selection system 521 that may be used by system operators or third parties to input keywords, logos, audio clips, or other match pattern data that may be used by the system. In some embodiments, user's may bid on keywords, location matches, or other pattern information in order to select system actions that will be taken in response to a match of scan data to the selected pattern. Such actions may be input to a match selection system 521 using an application with an interface to enable payment, bidding, selection of keywords or pattern data, selection of system actions to associate with keywords or pattern data, or any other such information that may be used by any embodiment described herein.

Additionally, in some embodiments, messaging applications 507 may interact with a $3^{rd}$ party search server 503 to implement image search as part of a scanning process, with search results used to identify scan information matches to system patterns, to prioritize actions based on search results, and to present search results to a user as a system action. In other embodiments, a messaging application 507 may interact with third party search server 503 via platform 502. Still further embodiments may incorporate multiple modules including search modules for images, audio, keywords, or other pattern matching processes, into platform 502.

In various embodiments, the data exchanges within the network system 500 may be dependent upon user-selected functions available through one or more client or user interfaces (UIs). The UIs may be associated with a client machine, such as the client devices 510, 512 using instances of a messaging application 507A, 507B on each device, such as a client application. The messaging application 507 may be in communication with the scan module via an application server 518. The client devices 510, 512 may comprise mobile devices with wireless communication components and applications for sending specific types of electronic messages (e.g., ephemeral messages) over the network 504 (e.g., using messaging application 507).

In addition to the system managing communication and storage of messages among the client device 510, the client device 512, and the application server 518, the different messaging applications 507A and 507B operating on the corresponding client devices 510 and 512 have respective scan analysis modules 509A and 509B. In various embodiments, these scan message analysis modules 509A, 509B may receive data captured from any number of sensors or I/O modules of the corresponding client device, and identify certain patterns associated with the captured data. This includes identifying certain audio patterns that may be associated with a song or artist, identifying image patterns that may be associated with a brand registered with the system, a quick response code or bar code, an element of an image associated with a system keyword, or other such patterns set within a system to be identified by a combination of scan analysis module 509 and scan module 520. Scan analysis modules 509 may also be used to manage sets of scan data where no priority patterns are found, and to communicate with a third party search 503 service or server.

Figure 6:
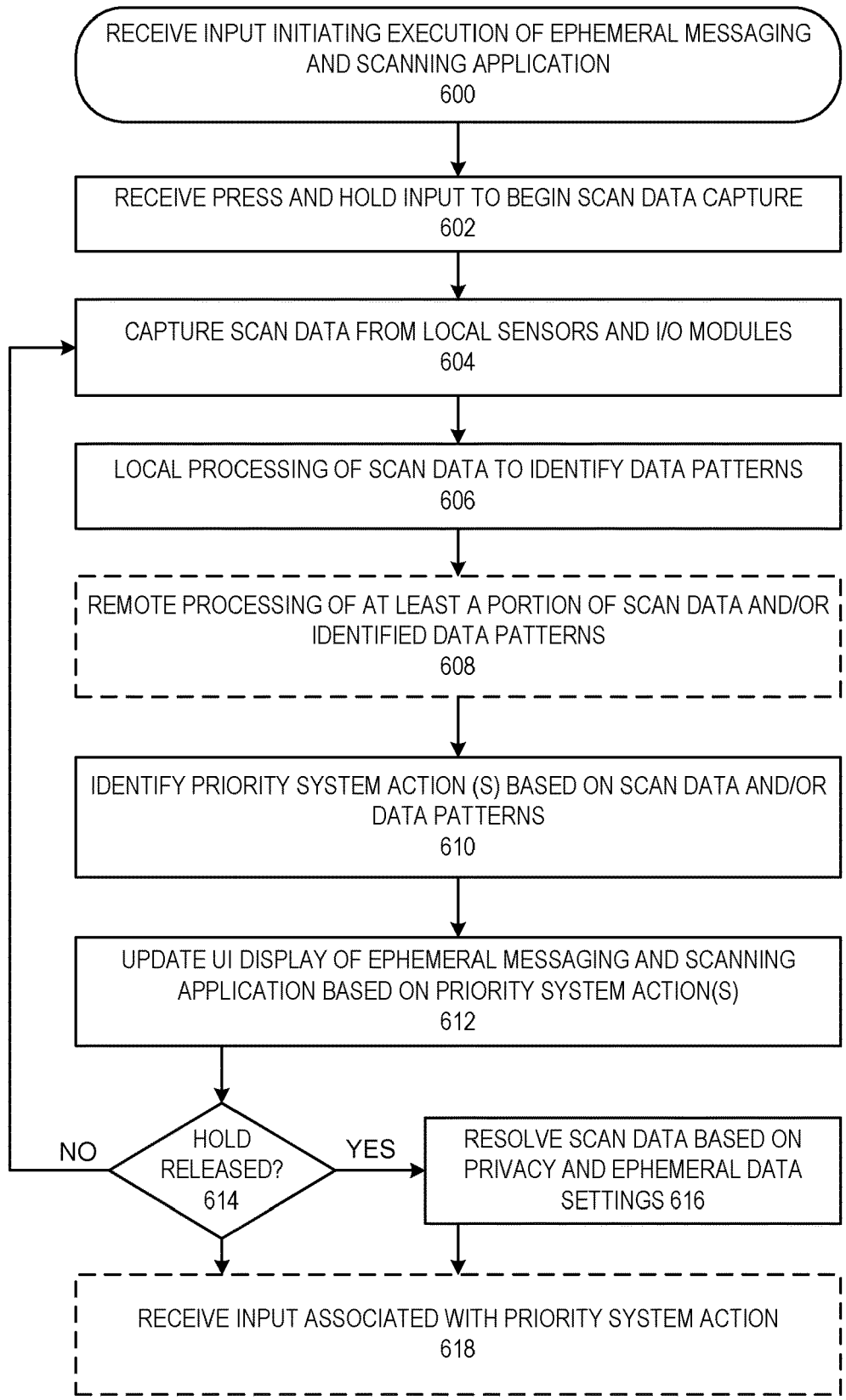
FIG. 6 describes one possible method in accordance with embodiments described herein.

FIG. 6 then describes another method for prioritized device actions in response to scan data. In the method of FIG. 6, operation 600 begins the method with reception of an input initiating executing an ephemeral messaging and scanning application on a client device. This may be similar to application 408 of FIG. 4, messaging application 507 of FIG. 5, or any other such application operating on a device. In certain embodiments, such an ephemeral messaging and scanning application may operate in a system to protect a user's privacy and limit the amount of personal data stored by the system, such that messages and scan data captured as part of the operation of the application are set for automatic deletion after the data is used.

During execution of the messaging and scanning application, an image capture interface is available to a user including a scanning input, as described in FIG. 4A. In operation 602, a press and hold input is received to begin the capture of scan data, and in operation 604, the data is captured and stored. This may include capture of data from any sensor or I/O module within a device, including data from any I/O components such as I/O components 950, or any other such sensors or modules described herein.

In operation 606, the scan data is analyzed locally to identify any patterns within the data that may be identified based on locally stored processing systems, for example, using a scan analysis module 509. This may, for example, involve processing images to generate keywords associated with the images using a set of local system patterns, and processing keywords and text in the scan data against a database of keywords having associated actions.

In some embodiments, remote image search or processing of scan data may be performed in operation 608 in order to supplement the local processing of the scan data. This may include third party search services, or scan modules operating on a data sharing platform as described with respect to FIG. 5.

Once all data patterns in the system are compared against the scan data to identify matches, then the resulting list of matches are identified in operation 610 and prioritized based on the system priority structure. This may include a scoring algorithm, a waterfall selection, or any other such method for ranking matches and the associated system actions associated with the matches. In operation 612, the user interface presented to a user with the interface for the scan data capture is updated based on the priority system actions. This may include presenting links, images, text, or new user interface options associated with image capture.

In operation 614, the application checks to see if the press and hold input that initiated the scan has been released. If not, the system continues capturing data and updating the priority system actions. This may include updating and adjusting any UI portion associated with system actions.

If the scanning is complete and the hold has been released, then the system actions based on the scan data are performed, and the scan data is resolved based on privacy and ephemeral data settings, in operation 616. This may involve deleting scan data from the device and any remote server or platform that was used for the scan process. This may involve transforming aspects of the scan data and storing the data without elements identifying the user for use in future prioritization processes.

At any point, then, a user may adjust from a press and hold input to selecting another input associated with a priority system action. This may include selecting a link or communication action associated with information presented based on a pattern match. This may also include making use of an imaging option provided based on scan data via a selection within the image capture interface.

Figure 7:
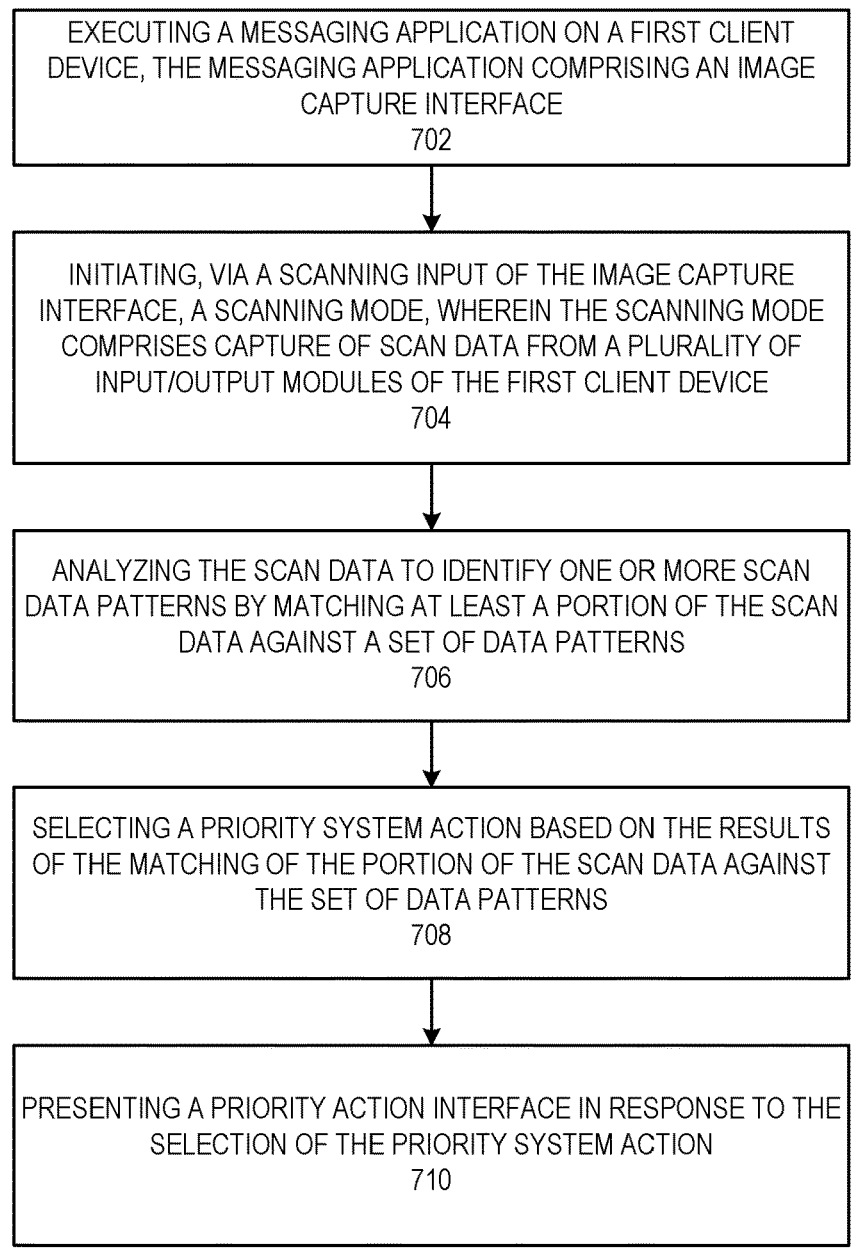
FIG. 7 describes one possible method in accordance with embodiments described herein.

FIG. 7 then describes another additional method 700 for automatic device actions triggered by scan data. Operation 702 involves executing a messaging application on a first client device, the messaging application comprising an image capture interface. Operation 704 involves initiating, via a scanning input of the image capture interface, a scanning mode, wherein the scanning mode comprises capture of scan data from a plurality of input/output modules of the first client device. Operation 706 involves analyzing the scan data to identify one or more scan data patterns by matching at least a portion of the scan data against a set of data patterns. Operation 708 involves selecting a priority system action based on the results of the matching of the portion of the scan data against the set of data patterns. Operation 710 involves presenting a priority action interface in response to the selection of the priority system action.

Additional embodiments may include the above operations in varying order, with intervening operations or repeated operations in different orders. In some embodiments, certain operations may be omitted or performed in various groupings to implement actions triggered by scan data.

In some additional embodiments, as described above, operations further include presenting, on a display of the first client device, a priority action interface in response to the selection of the priority system action. Such an interface may include matching data or customer provided data matching a logo or audio match. Such an interface may include lists of text results for scan data matched with system data patterns. Such an interface may also include image search results from a local search of image data, or a networked image search. In various embodiments, different combinations of these interface elements or other search result information may be presented.

Some further embodiments include operations including identifying, using the one or more processors, a plurality of scan data patterns, where each scan data patterns of the plurality of scan data patterns matches at least one data pattern of the set of data patterns where selecting the priority system action comprises selecting a first scan data pattern of the plurality of scan data patterns based on a pattern type ranking. One such embodiment includes a first level ranking for scan codes and may also include ranking levels for audio signatures, logos, and registered keywords. Further embodiments may include rankings for registered keywords or system keywords.

In some embodiments, the scan data includes one or more images captured by an image sensor of the first client device, and image processing of the captured images results in keywords associated with portions of the images. These keywords may then be matched against registered keywords, system keywords, or local images (e.g. data patterns.)

In some embodiments, first client device captures scan data using some or all of a plurality of sensor devices, including a camera device, a position sensor, a temperature sensor, a motion sensor, a microphone, and one or more wireless communication modules. Associated scan data may include wireless access point name data, image data, video data, audio data, location data, temperature data, and motion data.

Some additional embodiments include operations such as communicating a second portion of the scan data to a third party search server when a match of the portion of the scan data and the set of pattern data is not found, wherein the priority system action is associated with a set of search results from the third party search server.

In some embodiments, analyzing, using the one or more processors, the scan data to identify the one or more scan data patterns by matching at least the portion of the scan data against the set of data patterns comprises processing one or more images of the scan data using a neural network implemented on the first client device to identify keywords associated with one or more objects from the one or more images.

Some embodiments operate where the priority system action involves communicating an image search request to a networked server computer using the keywords, receiving a plurality of search results from the networked server computer in response to the image search request, and presenting the image search interface on the display with the plurality of search results from the networked server computer.

While the methods described above present operations in a particular order, it will be appreciated that alternate embodiments may operate with certain operations occurring simultaneously or in a different order. In many such embodiments, the order and timing of operations may vary between instances of the operations.

Figure 8:
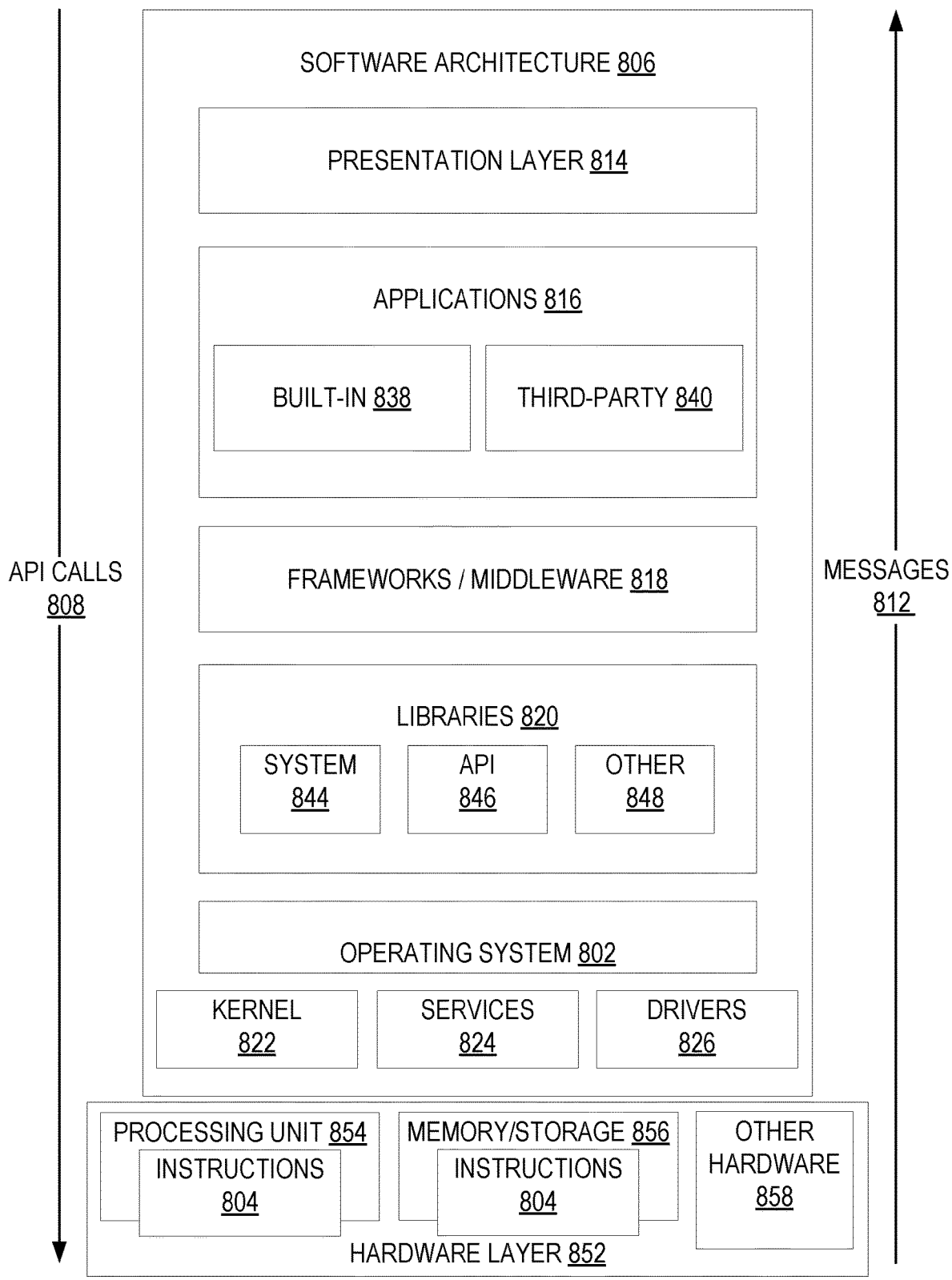
FIG. 8 is a block diagram illustrating a representative software architecture, which may be used in conjunction with various hardware architectures herein described and used to implement various embodiments.

FIG. 8 is a block diagram illustrating an example software architecture 806, which may be used in conjunction with various hardware architectures herein described. FIG. 8 is a non-limiting example of a software architecture 806 and it will be appreciated that many other architectures may be implemented to facilitate the functionality described herein. The software architecture 806 may execute on hardware such as machine 1000 of FIG. 10 that includes, among other things, processors 1004, memory 1014, and I/O components 1018. A representative hardware layer 852 is illustrated and can represent, for example, the machine 1000 of FIG. 10. The representative hardware layer 852 includes a processing unit 854 having associated executable instructions 804. Executable instructions 804 represent the executable instructions of the software architecture 806, including implementation of the methods, components and so forth described herein. The hardware layer 852 also includes memory and/or storage modules memory/storage, which also have executable instructions 804. The hardware layer 852 may also comprise other hardware 858.

In the example architecture of FIG. 8, the software architecture 806 may be conceptualized as a stack of layers where each layer provides particular functionality. For example, the software architecture 806 may include layers such as an operating system 802, libraries 820, applications 816 and a presentation layer 814. Operationally, the applications 816 and/or other components within the layers may invoke application programming interface (API) API calls 808 through the software stack and receive messages 812 in response to the API calls 808. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824 and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824 and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphic user interface (GUI) functions, high-level resource management, high-level location services, and so forth. The frameworks/middleware 818 may provide a broad spectrum of other APIs that may be utilized by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 840 may invoke the API calls 808 provided by the mobile operating system (such as operating system 802) to facilitate functionality described herein.

The applications 816 may use built in operating system functions (e.g., kernel 822, services 824 and/or drivers 826), libraries 820, and frameworks/middleware 818 to create user interfaces to interact with users of the system. Alternatively, or additionally, in some systems interactions with a user may occur through a presentation layer, such as presentation layer 814. In these systems, the application/component "logic" can be separated from the aspects of the application/component that interact with a user.

Figure 9:
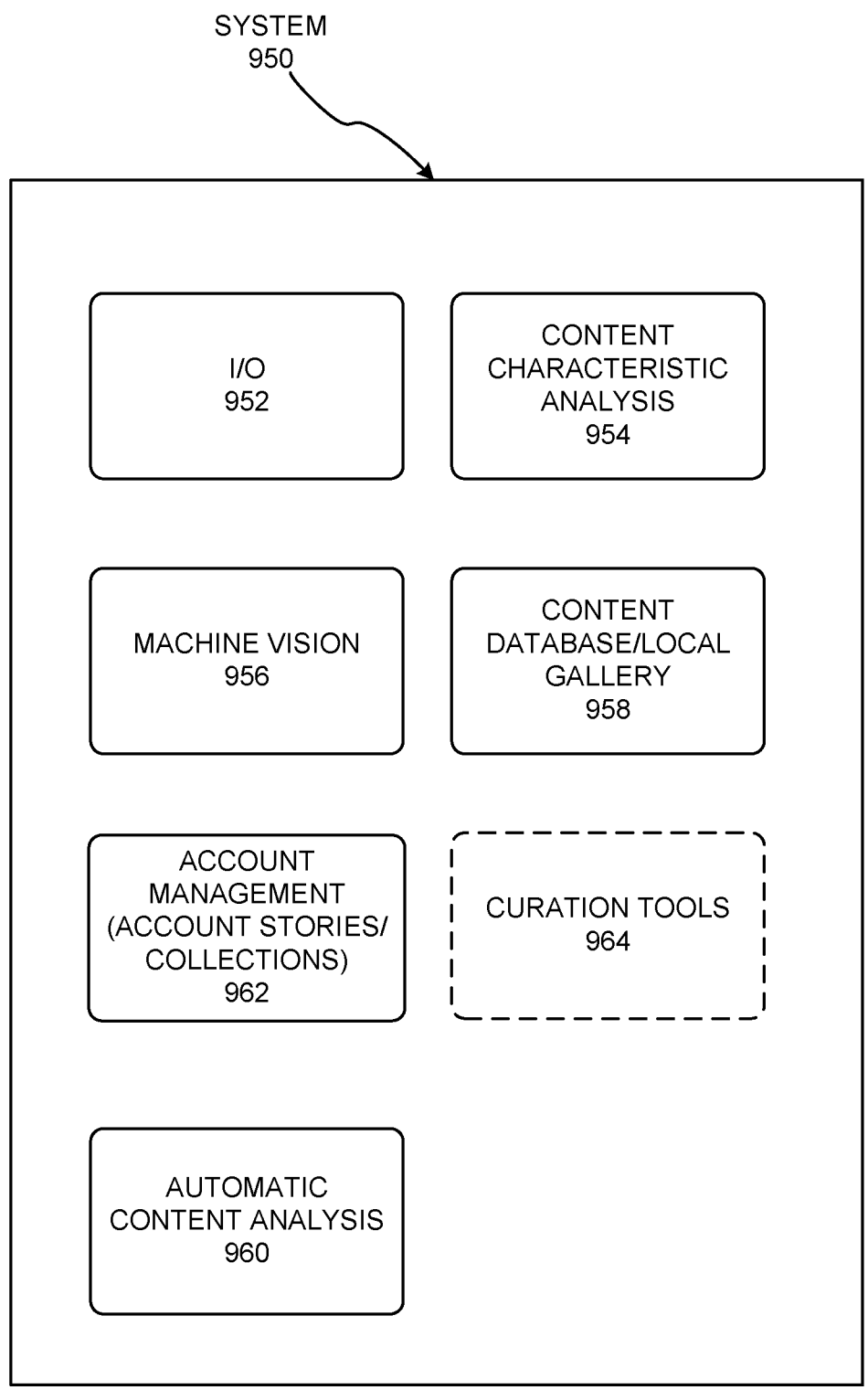
FIG. 9 illustrates aspects of a system that may be used for local scanning operations and/or ephemeral messaging, according to some example embodiments.

FIG. 9 illustrates aspects of a system 950 that may be used for local scanning operations and/or ephemeral messaging, according to some example embodiments. In some embodiments, system 950 may be implemented as part of an ephemeral messaging and scanning application on a device as an application 816 within software architecture 806. In other embodiments, system 950 may be used as an implementation of server system or application server. The example server system 950 includes input and output (I/O) module 952, content characteristic analysis module 954, machine vision module 956, content database 958, account management module 962, automatic content analysis module 960, and curation tools 964.

I/O module 952 may include any hardware, firmware, or software elements needed to send and receive content and content collections to client devices via a network. Content characteristic analysis module 954 may include devices, processors, and software to analyze images from pictures and frames of video clips, and then determine content characteristics, including details about when and where a picture or video was generated. In certain embodiments, content characteristic analysis module 954 may be implemented as a plurality of different modules, each analyzing a different content characteristic, including any content characteristic described herein.

Machine vision module 956 describes a particular module that may be used to identify content characteristics based on the content of an image or images in a video. Machine vision module 956 includes hardware, firmware, and/or software for analyzing and understanding content. In one embodiment, machine vision module 956 is associated with a dictionary comprising image and video content values. Objects identified in images of a piece of content and the arrangement of the identified objects therein may be used by machine vision module 956, in such an embodiment, to select one or more content values from the dictionary as content characteristics. For example, a simple machine vision module 956 may identify a ball in an image, and select the values "ball" and "game" as content characteristics. A more complex module may identify the type of ball as a basketball, and include "basketball" as a characteristic value. A still more complex machine vision module 956 may identify a basketball, a crowd, a court color, and an elevated perspective of the court to identify "professional basketball game" and "basketball arena" as content values for the content. The same complex machine vision module 956 may identify a basketball, a park background, and a concrete court surface and associate "amateur basketball game" and "playground basketball" as content values for the content within scan data. Such content values may operate as context values which are used to generate content collections as described herein. Other types of context values besides such content values, however, may be used to generate content collections without using content values, or in addition to such content values. For example, one embodiment of an image may have associated context data comprising location data (e.g. coordinates or a geofence), time data (e.g. a time of day, a day of the month, an hour, etc.) content values (e.g. trees, basketball court, a face, etc.) quality values (e.g. blur, exposure, brightness, contrast, etc.) or any other such values which are referred to herein as context data.

These content values generated by machine vision module 956 can then be stored in content database 958 along with other characteristic values. Such characteristic values can include: one or more content values (i.e., an identification of what's in the content); a generation time; a generation time period; a generation location; a generation area; one or more quality values; any metadata value associated with content; an identifier for a particular piece of content; or any other such values. In some embodiments, a copy of content may be stored in content database 958 with location information, capture time information, and any other such information about a piece of content. In certain embodiments, content database 958 may anonymously store details about content use. For example, client devices 102, 610, 620 can communicate details about presentation of the content on a screen of the device, and about screenshots taken of the content. Anonymous metrics about how often a piece of content is viewed as part of a content collection, how long the content is viewed for, and how frequently screenshots are taken may then be measured by server system 950, as part of analysis by content characteristic analysis module 954, with the resulting data stored in content database 958.

Account management module 962 includes application or interface functionality to enable users to manage entity/account relationships via communications between user devices and server system 950. Account management module 962 may also manage an individual user's content collections or locally stored gallery data and scan data.

In some embodiments, curation tools 964 include tools available to system operators or advertisers to generate and present content collections from large amounts of content made available by user selection to be included in public content collections (e.g., live content collections, location content collections, content-based content collections, etc.). Similarly, automatic content analysis module 960 may filter pieces of content to generate content collections grouped by location, time, topic, or on any other such basis. In some embodiments, elements of automatic content analysis module 960 are used to filter the number of pieces of content provided to curation tools 964 to a smaller number. This may occur both locally, by filtering an individual user's scan, image, video, and other data, or globally by filtering content from many different users received at a system server computer.

In some embodiments, automatic content analysis module 960 may then use information about pieces of content from content database 958 to select particular pictures or videos for an automatically generated content collection. In various embodiments, automatic content analysis module 960 may use complex scoring, weighting, and other rules in generating a content collection. For example, certain embodiments may function such that all pieces of content meet a quality threshold unless a trend having certain threshold characteristics is identified and all content associated with the trend are below the quality threshold. Another embodiment may weight content collection generation based on a number of content collections currently available in a local geographic area. In still further embodiments, any number of complex rules may be applied together as part of content collection generation to filter images and videos for a content collection based on time, location, content, and quality.

In some embodiments, quality scoring within automatic content analysis module 960 may be used to analyze scan data, or to filter or select pieces of content for a particular content collection and to filter different content collections for presentation to a user. A quality score, in some embodiments, is based on a detailed exposure analysis of an image or a sample of frames in a video clip. For example, a histogram of luminance may be calculated, and a quality may be assigned to the image or video based on a correlation of the histogram with a quality score. Such a correlation may be based on a table or function associating certain histogram patterns with selected quality scores, or may be generated in any other such matters. For video where multiple sample frames are analyzed, an average of scores for each frame may be used to select a score, a worst score for an individual frame of all the analyzed frames may be used, or any such combination or function of multiple scores or selections of scores may be used.

In some embodiments, motion-blur estimation of an image or of selected video clips is used as a part of the quality score. Such motion blur estimation may, for example, be based on a calculation of energy gradients on detected edges, or other such motion estimations. For video clips, identifying video frames with motion blur above a threshold amount may trigger analysis of additional sample frames to determine how much of the video is impacted by motion blur, or to identify when a shakiness of a camera sensor impacts an entire video. In certain embodiments, a system may use a threshold for video motion or "shakiness" to filter out videos with camera motion or shake above the threshold. In other embodiments, a shakiness or motion score may simply modify an overall quality score. In other embodiments, both a hard threshold as well as an input to an overall quality score may be used.

In some embodiments, images or sample video frames may be analyzed for compression artifacts or other image processing artifacts that indicate a lower image quality or errors introduced into an image due to various compression or communication problems. Such artifacts may include image ringing, image contouring, staircase noise along curving edges, posterizing artifacts, or block boundary artifacts. Videos may be analyzed for additional video-based compression artifacts such as block boundary artifacts associated with motion compensation or mosquito noise that may be identified by analysis of selected frames of a video. The presence of such compression artifacts and the intensity of any identified compression artifacts may be used to modify or select a quality score for an image or video clip. In addition to such information loss associated with compression or lossy transmission, images and video frames may also be analyzed for other types of noise. For example, variance in smooth or uniform regions of an image may be analyzed for noise artifacts, such as noise associated with a low quality or malfunctioning camera sensor, low quality or dirty optics of a camera, or any other such source of noise that may lower, corrupt, or modify the data in the image.

Audio data is also used for quality scoring of video clips in some embodiments. In such embodiments, various audio metrics such as dynamic range, noise levels, language clarity or language recognition data, or any other such audio-based information, may be used to select an audio quality score or to impact an overall quality score. Different audio data metrics, in some embodiments, are used based on a determined audio environment. For example, a video clip with speech may be assessed differently than a clip with music, or video clips with different types of music may be assessed differently. Additionally, audio spotting to identify objectionable audio content (e.g., taboo spoken language or explicit music lyrics) can be used for a quality score or a quality threshold flag, in some embodiments.

In addition to quality scores based on image quality, some scores may be based on image content. For example, as mentioned above, image processing may be used to identify objectionable content such as nudity or taboo language within an image or video clip. In some embodiments, a preferred orientation (e.g., landscape or portrait) may be used for quality scoring. Some systems may additionally use image recognition to identify desirable content. For example, in some systems, images of animals or images of objects associated with a party environment are identified as desirable. The presence of such images within video frames or pictures may be used to increase an overall quality score, or to generate a content score.

Feedback or machine learning is used, in certain embodiments, to select or set a quality score. Such systems may use neural networks to extract features identified as preferred or interesting to system users. For example, in some embodiments, images selected by system users for inclusion in one or more stories may be selected for a learning set. Some or all images and video frames from the learning set may have features extracted and analyzed using a feed-forward artificial neural network such as a convolutional neural network to identify desirable elements of the images, and to automatically assign an interestingness score to future images received based on the neural network generated with the learning set. Feature maps used within such neural networks may be based on any analysis metric described herein, including image quality features and image content features. In some embodiments, learnable filters may be selected and automatically updated based on a database of images from image processing services used for content analysis of images or video frames. In other embodiments, any other such sources may be used for learnable filters. Such analysis may be applied to both image elements of content as well as to audio elements of videos. In some such embodiments, neural networks are optimized for a mobile device environment with limited resources, such that neural network image analysis of scan data is performed locally on a device. In other embodiments, such analysis may be performed only by a remote server computer, and in further embodiments, both a mobile device capturing scan data and a networked server computer may share such processing of scan data.

Other feedback mechanisms may be used in various embodiments. For example, in some embodiments, a content source, user, or account associated with generating an image or video clip may have associated history data. In some embodiments, association of a content source with a history of content selected by system users or associated with high quality ratings may be used as an input to a quality score, or may be used as a quality flag. Various content source metrics such as the quality history, number of images sent, number of system followers or interconnections, or other such metrics may be used.

In some embodiments, multiple different quality scores may be associated with each individual piece of media content, so that an image may have an exposure quality score, a noise quality score, a motion quality score, a compression quality score, a resolution quality scores, an audio quality score, a content score, or any other such separate quality scores. In such embodiments, an overall quality score based on any combination of such individual quality scores may also be provided. Further, as mentioned above, some or all of such quality scores may individually be used to reject certain pieces of media content automatically, with only the images or videos that exceed all thresholds being presented to a system user. Such a system may have any number of thresholds based on separate quality scores or multiple different combinations of different quality scores. In some embodiments, such thresholds may be variable to present a target number of images and/or videos to a system user. Similarly, different types of images or video clips may be assessed differently, such that weights may be applied to different images differently based on content, location, time, proximity in location or time to a holiday or news event, overall environment, or other such information. The metrics and weights for any of the above, in some embodiments, are applied differently to a selfie taken inside than to concert footage taken outdoors at night. Further, aggregated interest and quality scores for complete sets of content collections (e.g., balanced or weighted scoring for pieces of content within a content collection) are used to sort and select content collections for presentation to a user.

In some embodiments, any such analysis described above may be used with scan data, including any number of image frames captured as part of scan data, and any other associated data. In some embodiments, prioritized actions are taken following analysis of scan data, or an initial analysis of scan data is used to filter the scan data, and prioritized actions are then taken based on the filtered scan data.

Figure 10:
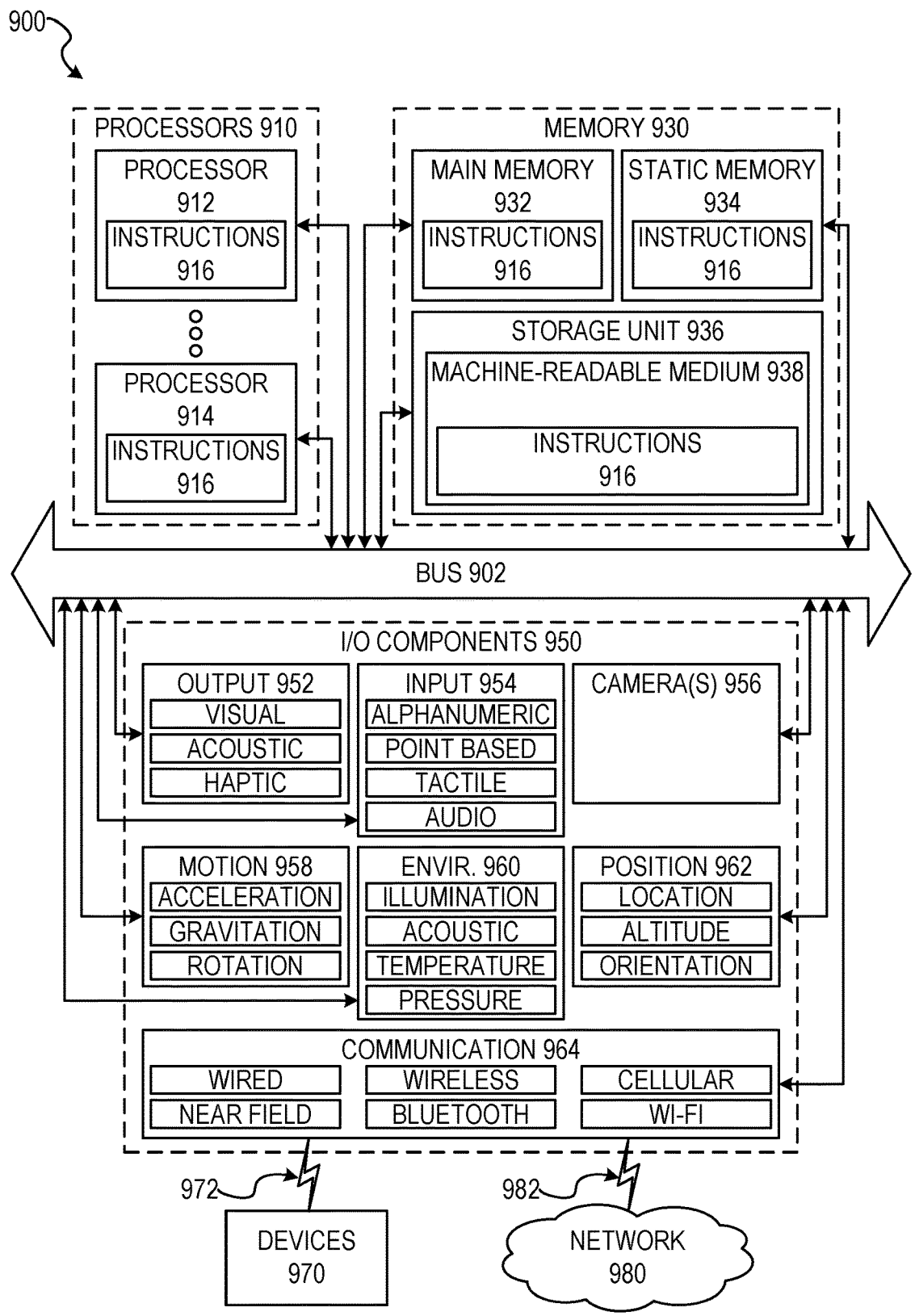
FIG. 10 is a block diagram illustrating components of a machine, according to some example embodiments, able to read instructions from a machine-readable medium (e.g., a machine-readable storage medium) and perform any one or more of the methodologies discussed herein.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory memory/storage 1006, and I/O components 1018, which may be configured to communicate with each other such as via a bus 1002. The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1030, motion components 1034, environment components 1036, or position components 1038 among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environment components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1032 or devices 1020 via coupling 1022 and coupling 1024 respectively. For example, the communication components 1040 may include a network interface component or other suitable device to interface with the network 1032. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a Universal Serial Bus (USB)).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geo-location, location via Wi-Fi® signal triangulation, location via detecting a NFC beacon signal that may indicate a particular location, and so forth.

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory, even if the message is temporarily stored in a non-transitory computer readable medium.

"MACHINE-READABLE MEDIUM" or "NON-TRANSITORY COMPUTER READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

What is claimed is:
1. A method comprising:
causing to be displayed, by a client device, a user interface (UI) comprising indications of a plurality of system actions;
causing, by one or more processors, a plurality of input devices to capture a plurality of scan data, the plurality of input devices comprising a camera and a microphone;
analyzing, using one or more processors and a neural network, the plurality of scan data to identity one or more objects in the plurality of scan data;
matching the identified one or more objects with a plurality of data patterns to identify a plurality of identified data patterns of the plurality of data patterns;
selecting a first identified data pattern of the plurality of identified data patterns based on a pattern type ranking, wherein the plurality of identified data patterns is associated with the plurality of system actions, and wherein the first identified data pattern is associated with a first system action of the plurality of system actions, and wherein the pattern type ranking is based on a priority of the plurality of system actions;
adjusting the plurality of system actions based on the first system action; and
causing to be displayed, by the client device, the UI comprising the adjusted plurality of system actions comprising an indication of the first system action.

2. The method of claim 1 wherein the plurality of scan data comprises an image comprising a scan code, and the pattern type ranking comprises a first level ranking for a scan code pattern.

3. The method of claim 1 wherein the plurality of input devices further comprise one or more of: a position sensor, a temperature sensor, a motion sensor, or a wireless communication device.

4. The method of claim 1 wherein causing to be displayed further comprises:
causing to be displayed on a display of the client device an interface including an option to perform one of the adjusted plurality of system actions or the first system action.

5. The method of claim 1 wherein the plurality of data patterns comprises one or more of: a scan code pattern, an audio signature pattern, a logo pattern, a register trademark pattern, a pattern associated with a third-party registered keyword, and a pattern associated with a system keyword.

6. The method of claim 1 wherein the plurality of scan data comprises one or more of: wireless access point name data, image data, video data, audio data, location data, temperature data, and motion data.

7. The method of claim 1 further comprising:
in response to the matching the identified one or more objects with the plurality of data patterns failing to find a match, communicating the plurality of scan data to a third-party search server, andreceiving the first system action from the third-party search server.

8. The method of claim 1 wherein the first system action comprises performing an image search using keywords associated with the one or more objects, and wherein the causing further comprises: causing to be displayed an image search interface on a display of the client device with images from an image gallery.

9. The method of claim 8, wherein the matching further comprising: matching the identified one or more objects with the plurality of data patterns to identify the plurality of identified data patterns of the plurality of data patterns, wherein the one or more objects are associated with one or more keywords.

10. The method of claim 1 wherein the matching further comprises:
identifying keywords associated with the identified one or more objects; andmatching the identified one or more objects with the plurality of data patterns based on the identified keywords.

11. The method of claim 10 wherein the first system action comprises an image search and wherein before the causing the method further comprises:
communicating, to a network computer, a request to perform the image search with a keyword of the identified keywords; and
receiving a plurality of search results from the networked computer in response to the image search request.

12. The method of claim 11 wherein the causing to be displayed further comprises:
causing to be displayed, by the client device, the indication of the first system action, wherein the indication of the first system action is the plurality of search results.

13. An apparatus of a client device comprising:
one or more processors; and
a memory storing instructions that, when executed by the one or more processors, configure the one or more processors to perform operations comprising:
causing to be displayed, by a client device, a user interface (UI) comprising indications of a plurality of system actions;
causing, by one or more processors, a plurality of input devices to capture a plurality of scan data, the plurality of input devices comprising a camera and a microphone;
analyzing, using one or more processors and a neural network, the plurality of scan data to identity one or more objects in the plurality of scan data;
matching the identified one or more objects with a plurality of data patterns to identify a plurality of identified data patterns of the plurality of data patterns;
selecting a first identified data pattern of the plurality of identified data patterns based on a pattern type ranking, wherein the plurality of identified data patterns is associated with the plurality of system actions, and wherein the first identified data pattern is associated with a first system action of the plurality of system actions, and wherein the pattern type ranking is based on a priority of the plurality of system actions;
adjusting the plurality of system actions based on the first system action; and
causing to be displayed, by the client device, the UI comprising the adjusted plurality of system actions comprising an indication of the first system action.

14. The apparatus of claim 13 wherein the scan data comprises an image comprising a scan code, and the pattern type ranking comprises a first level ranking for a scan code pattern.

15. The apparatus of claim 13 wherein the plurality of scan data comprises an image comprising a scan code, and the pattern type ranking comprises a first level ranking for a scan code pattern.

16. The apparatus of claim 13 wherein the plurality of input devices further comprise one or more of: a position sensor, a temperature sensor, a motion sensor, or a wireless communication device.

17. A non-transitory computer-readable storage medium, the non-transitory computer-readable storage medium including instructions that, when executed by at least one processor of an apparatus of a client device, cause the at least one processor to perform operations comprising:
causing to be displayed, by a client device, a user interface (UI) comprising indications of a plurality of system actions; causing, by one or more processors, a plurality of input devices to capture a plurality of scan data, the plurality of input devices comprising a camera and a microphone; analyzing, using one or more processors and a neural network, the plurality of scan data to identity one or more objects in the plurality of scan data;
matching the identified one or more objects with a plurality of data patterns to identify a plurality of identified data patterns of the plurality of data patterns;
selecting a first identified data pattern of the plurality of identified data patterns based on a pattern type ranking, wherein the plurality of identified data patterns is associated with the plurality of system actions, and wherein the first identified data pattern is associated with a first system action of the plurality of system actions, and wherein the pattern type ranking is based on a priority of the plurality of system actions;
adjusting the plurality of system actions based on the first system action; and causing to be displayed, by the client device, the UI comprising the adjusted plurality of system actions comprising an indication of the first system action.

18. The non-transitory computer-readable storage medium of claim 17 wherein the plurality of scan data comprises an image comprising a scan code, and the pattern type ranking comprises a first level ranking for a scan code pattern.

19. The non-transitory computer-readable storage medium of claim 17 wherein the plurality of input devices further comprise one or more of: a position sensor, a temperature sensor, a motion sensor, or a wireless communication device.

* * * * *